(12) United States Patent
Geng et al.

(10) Patent No.: US 12,015,915 B2
(45) Date of Patent: Jun. 18, 2024

(54) COMMUNICATION METHOD AND APPARATUS

(71) Applicant: HUAWEI TECHNOLOGIES CO., LTD., Shenzhen (CN)

(72) Inventors: Tingting Geng, Shanghai (CN); Haiyan Luo, Shenzhen (CN); Le Yan, Shenzhen (CN); Qinghai Zeng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 313 days.

(21) Appl. No.: 17/513,405

(22) Filed: Oct. 28, 2021

(65) Prior Publication Data

US 2022/0053326 A1 Feb. 17, 2022

Related U.S. Application Data

(63) Continuation of application No. PCT/CN2020/080709, filed on Mar. 23, 2020.

(30) Foreign Application Priority Data

Apr. 29, 2019 (CN) .......................... 201910357357.8

(51) Int. Cl.
*H04M 1/66* (2006.01)
*H04W 12/0431* (2021.01)
(Continued)

(52) U.S. Cl.
CPC ..... *H04W 12/0431* (2021.01); *H04W 12/106* (2021.01); *H04W 12/122* (2021.01); *H04W 36/08* (2013.01); *H04W 84/042* (2013.01)

(58) Field of Classification Search
CPC .................. H04W 12/0431; H04W 12/106; H04W 12/06

See application file for complete search history.

(56) References Cited

U.S. PATENT DOCUMENTS

| 9,226,145 B1 | 12/2015 | Loman et al. |
| 2014/0150064 A1* | 5/2014 | Wifvesson .............. H04L 63/08 726/3 |

(Continued)

FOREIGN PATENT DOCUMENTS

| CN | 1816216 A | 8/2006 |
| CN | 101473668 A | 7/2009 |

(Continued)

OTHER PUBLICATIONS

Intel: "pCR to TR 33.899: Fake gNB Detection using Identity BasedSignature", 3GPP Draft; Draft S3-170462,Feb. 10, 2017, XP051217763,total 4 pages.

(Continued)

*Primary Examiner* — Shantell L Heiber
(74) *Attorney, Agent, or Firm* — HAUPTMAN HAM, LLP

(57) ABSTRACT

This application provides a communication method and apparatus, and relates to the field of communication technologies. The method may include: A network device performs integrity protection on system information by using a first private key, and sends the system information, where the system information includes a first public key corresponding to the first private key and/or an index of the first public key. Correspondingly, a terminal device receives the system information from the network device, and if determining that the first public key is valid, the terminal device verifies integrity of the system information by using the first public key. According to this method, on one hand, the terminal device can effectively identify validity of the system information. On the other hand, because the system information includes the first public key and/or the index of the first public key, flexible update of an asymmetric key can be implemented.

20 Claims, 13 Drawing Sheets

(51) Int. Cl.
*H04W 12/106* (2021.01)
*H04W 12/122* (2021.01)
*H04W 36/08* (2009.01)
*H04W 84/04* (2009.01)

(56) References Cited

U.S. PATENT DOCUMENTS

| | | | |
|---|---|---|---|
| 2015/0004925 A1 | 1/2015 | Suh et al. | |
| 2015/0222427 A1 | 8/2015 | Tie et al. | |
| 2017/0180419 A1* | 6/2017 | Pedersen | H04L 63/061 |
| 2018/0124696 A1* | 5/2018 | Nair | H04W 12/04 |
| 2018/0367303 A1* | 12/2018 | Velev | H04L 9/0891 |
| 2019/0251241 A1* | 8/2019 | Bykampadi | H04W 12/009 |
| 2020/0021993 A1* | 1/2020 | Yang | H04W 72/23 |

FOREIGN PATENT DOCUMENTS

| | | |
|---|---|---|
| CN | 101677453 A | 3/2010 |
| CN | 101873648 A | 10/2010 |
| CN | 103765809 A | 4/2014 |
| CN | 104160730 A | 11/2014 |
| CN | 104581843 A | 4/2015 |
| CN | 104936176 A | 9/2015 |
| CN | 106341813 A | 1/2017 |
| CN | 108476131 A | 8/2018 |
| EP | 1686825 A2 | 8/2006 |
| EP | 3226032 A1 | 10/2017 |
| WO | 2017176068 A1 | 10/2017 |

OTHER PUBLICATIONS

European Search Report issued in corresponding European Application No. 20798210.9, dated May 9, 2022, pp. 1-8.
Qualcomm Incorporated, Ciphering keys delivery for broadcast of ciphered assistance data. 3GPP TSG-CT WG1 Meeting #111, Osaka (Japan), May 21-25, 2018, C1-183196, 35 pages.
Chen Yan-Ii et al., Secure Data Aggregation Scheme for Multiple Applications in Wireless Sensor Networks. Computer Science. vol. 44, No. 9, Sep. 2017, 6 pages.
International Search Report issued in corresponding International Application No. PCT/CN2020/080709, dated Jun. 30, 2020, pp. 1-11.
Chinese Office Action issued in corresponding Chinese Application No. 201910357357.8, dated Mar. 31, 2021, pp. 1-10.
Chinese Office Action issued in corresponding Chinese Application No. 201910357357.8, dated Oct. 19, 2021, pp. 1-9.

* cited by examiner

COMMUNICATION METHOD AND APPARATUS

CROSS-REFERENCE TO RELATED APPLICATIONS

This application is a continuation of International Application No. PCT/CN2020/080709, filed on Mar. 23, 2020, which claims priority to Chinese Patent Application No. 201910357357.8, filed on Apr. 29, 2019. The disclosures of the aforementioned applications are hereby incorporated by reference in their entireties.

TECHNICAL FIELD

This application relates to the field of communication technologies, and in particular, to a communication method and apparatus.

BACKGROUND

In a wireless communication system, a network device notifies, by using system information (system information, SI), a terminal device of various types of information about a network, for example, network information of a cell in which the terminal is located, information about a registration area, information about a common channel, and information about another cell.

However, no security protection is performed on system information in an existing network. Consequently, some security problems may exist. For example, a false network device (or referred to as a fake network device) may modify system information sent by a genuine network device, and a terminal device cannot identify validity of the received system information.

SUMMARY

In view of this, this application provides a communication method and apparatus, used by a terminal device to effectively identify validity of received system information.

According to a first aspect, an embodiment of this application provides a communication method. The method includes: receiving first system information from a first network device, where the first system information includes a first key and/or an index of the first key; and if determining that the first key is valid, verifying integrity of the first system information by using the first key.

In a possible design, integrity protection is performed on the first system information based on a second key corresponding to the first key.

In a possible design, the determining that the first key is valid includes: receiving first information, where the first information includes at least one key, and if the at least one key includes the first key, determining that the first key is valid.

In a possible design, the determining that the first key is valid includes: receiving first information, where the first information includes at least one key and an index of the at least one key, and if the at least one key includes the first key, and/or the index of the at least one key includes the index of the first key, determining that the first key is valid.

In a possible design, the method further includes: receiving indication information, where the indication information is used to indicate a valid area to which the first information is applicable.

In a possible design, the indication information includes an identifier of the valid area to which the first information is applicable.

The identifier of the valid area includes at least one of the following: a public land mobile network identifier; a radio access network notification area identifier; a tracking area identity; a cell identifier; and a private network identifier.

In a possible design, the indication information is used to indicate that the valid area to which the first information is applicable is a tracking area list of a terminal device, or the indication information is used to indicate that the valid area to which the first information is applicable is a radio access network notification area of a terminal device.

In a possible design, the method further includes: if verification on the first system information fails, recording a failure report, where the failure report includes information about a first cell, location information, and an exception cause. The exception cause includes at least one of the following: integrity verification on the system information fails, the first cell is a fake cell, and the first network device is a fake network device.

In a possible design, the method further includes: performing reselection from the first cell to a second cell; and sending the failure report to a second network device to which the second cell belongs.

In a possible design, before the sending the failure report to a second network device, the method further includes: determining that verification on second system information sent by the second network device succeeds.

In the possible designs of the first aspect, the first key may be a public key, and the second key may be a private key. In this case, the first information may also be understood as public key information. Alternatively, the first key may be a private key, and the second key may be a public key. In this case, the first information may also be understood as private key information. For example, a public key and a private key corresponding to the public key form an asymmetric key pair. In other words, a private key and a public key corresponding to the private key forms an asymmetric key pair.

When the first key is the public key, the second key is the private key, and the first information is the public key information, the method in the first aspect may also be described as follows.

An embodiment of this application provides a communication method. The method includes: receiving first system information from a first network device, where the first system information includes a first public key and/or an index of the first public key; and if determining that the first public key is valid, verifying integrity of the first system information by using the first public key.

In a possible design, integrity protection is performed on the first system information based on a first private key corresponding to the first public key.

In a possible design, the determining that the first public key is valid includes: receiving public key information, where the public key information includes at least one public key; and if the at least one public key includes the first public key, determining that the first public key is valid.

In a possible design, the determining that the first public key is valid includes: receiving public key information, where the public key information includes at least one public key and an index of the at least one public key; and if the at least one public key includes the first public key, and/or the index of the at least one public key includes the index of the first public key, determining that the first public key is valid.

In a possible design, the method further includes: receiving indication information, where the indication information is used to indicate a valid area to which the public key information is applicable.

In a possible design, the indication information includes an identifier of the valid area to which the public key information is applicable, where the identifier of the valid area includes at least one of the following: a public land mobile network identifier; a radio access network notification area identifier; a tracking area identity; a cell identifier; and a private network identifier.

In a possible design, the indication information is used to indicate that the valid area to which the public key information is applicable is a tracking area list of a terminal device; or the indication information is used to indicate that the valid area to which the public key information is applicable is a radio access network notification area of a terminal device.

In a possible design, the method further includes: if verification on the first system information fails, recording a failure report, where the failure report includes information about a first cell, location information, and an exception cause. The exception cause includes at least one of the following: integrity verification on the system information fails, the first cell is a fake cell, and the first network device is a fake network device.

In a possible design, the method further includes: performing reselection from the first cell to a second cell; and sending the failure report to a second network device to which the second cell belongs.

In a possible design, before the sending the failure report to a second network device, the method further includes: determining that verification on second system information sent by the second network device succeeds.

According to a second aspect, an embodiment of this application provides a communication method. The method includes: performing integrity protection on first system information by using a second key; and sending the first system information, where the first system information includes a first key corresponding to the second key and/or an index of the first key.

In a possible design, the method further includes: receiving second information from a core network device, where the second information includes at least one asymmetric key pair, and the second key is a key included in one of the at least one asymmetric key pair.

In a possible design, the method further includes: sending first information to a terminal device, where the first information includes at least one first key.

In a possible design, the method further includes: receiving second information from a core network device, where the second information includes the second key included in at least one asymmetric key pair and an index of the at least one asymmetric key pair, and an index of the second key and the index of the first key are the same as an index of an asymmetric key pair formed by the second key and the first key.

In a possible design, the method further includes: receiving another key included in the at least one asymmetric key pair from the core network device, that is, receiving the first key included in the at least one asymmetric key pair from the core network device; and sending first information to a terminal device, where the first information includes at least one first key and an index of the at least one first key.

In a possible design, the method further includes: receiving indication information from the core network device, where the indication information is used to indicate a valid area to which the first information is applicable.

In a possible design, the method further includes: sending the indication information to the terminal device, where the indication information is used to indicate the valid area to which the first information is applicable.

In a possible design, the indication information includes an identifier of the valid area to which the first information is applicable, where the identifier of the valid area includes at least one of the following: a public land mobile network identifier; a radio access network notification area identifier; a tracking area identity; a cell identifier; and a private network identifier.

In a possible design, the indication information is used to indicate that the valid area to which the first information is applicable is a tracking area list of the terminal device, or the indication information is used to indicate that the valid area to which the first information is applicable is a radio access network notification area of the terminal device.

In a possible design, the method further includes: receiving a failure report sent by the terminal device, where the failure report includes information about a third cell, location information of the terminal device, and an exception cause. The exception cause includes at least one of the following: integrity verification on the system information fails, the third cell is a fake cell, and a third network device to which the third cell belongs is a fake network device.

In the possible designs of the second aspect, the first key may be a public key, and the second key may be a private key. In this case, the first information may be understood as public key information, and the second information may be understood as private key information.

Alternatively, the first key may be a private key, and the second key may be a public key. In this case, the first information may be understood as private key information, and the second information may be understood as public key information. For example, a public key and a private key corresponding to the public key form an asymmetric key pair.

When the first key is the public key, the second key is the private key, the first information is the public key information, and the second information is the private key information, the method in the second aspect may also be described as follows.

An embodiment of this application provides a communication method. The method includes: performing integrity protection on first system information by using a first private key; and sending the first system information, where the first system information includes a first public key corresponding to the first private key and/or an index of the first public key.

In a possible design, the method further includes: receiving private key information from a core network device, where the private key information includes at least one private key and at least one public key corresponding to the at least one private key, and the first private key is one of the at least one private key.

In a possible design, the method further includes: sending public key information to a terminal device, where the public key information includes the at least one public key.

In a possible design, the method further includes: receiving private key information from a core network device, where the private key information includes at least one private key and an index of the at least one private key, the first private key is one of the at least one private key, and an index of the first private key is the same as the index of the first public key.

In a possible design, the method further includes: receiving at least one public key from the core network device, where the at least one public key is in a one-to-one correspondence with the at least one private key; and sending public key information to a terminal device, where the public key information includes the at least one public key and an index of the at least one public key.

In a possible design, the method further includes: receiving indication information from the core network device, where the indication information is used to indicate a valid area to which the public key information is applicable.

In a possible design, the method further includes: sending the indication information to the terminal device, where the indication information is used to indicate the valid area to which the public key information is applicable.

In a possible design, the indication information includes an identifier of the valid area to which the public key information is applicable, where the identifier of the valid area includes at least one of the following: a public land mobile network identifier; a radio access network notification area identifier; a tracking area identity; a cell identifier; and a private network identifier.

In a possible design, the indication information is used to indicate that the valid area to which the public key information is applicable is a tracking area list of the terminal device, or the indication information is used to indicate that the valid area to which the public key information is applicable is a radio access network notification area of the terminal device.

In a possible design, the method further includes: receiving a failure report sent by the terminal device, where the failure report includes information about a third cell, location information of the terminal device, and an exception cause. The exception cause includes at least one of the following: integrity verification on the system information fails, the third cell is a fake cell, and a third network device to which the third cell belongs is a fake network device.

When the first key is the private key, the second key is the public key, the first information is the private key information, and the second information is the public key information, reference may be made to the foregoing processing.

According to a third aspect, an embodiment of this application provides a communication method. The method includes: sending second information to a network device, where the second information includes at least one asymmetric key pair; and sending first information to the network device or a terminal device, where the first information includes a first key included in the at least one asymmetric key pair.

A variation of the foregoing method is: sending second information to a network device, where the second information includes a second key included in at least one asymmetric key pair and an index of the at least one asymmetric key pair; and sending first information to a terminal device, where the first information includes a first key included in the at least one asymmetric key pair and an index of the at least one asymmetric key pair.

In a possible design, the method further includes: sending, by a core network device, indication information to the network device or the terminal device, where the indication information is used to indicate a valid area to which the first information is applicable.

In a possible design, the indication information includes an identifier of the valid area to which the first information is applicable, where the identifier of the valid area to which the first information is applicable includes at least one of the following: a public land mobile network identifier; a radio access network notification area identifier; a tracking area identity; and a cell identifier.

In a possible design, the indication information is used to indicate that the valid area to which the first information is applicable is a tracking area list of the terminal device, or the indication information is used to indicate that the valid area to which the first information is applicable is a radio access network notification area of the terminal device.

In the possible designs of the third aspect, the first key may be a public key, and the second key may be a private key. The first information may be understood as public key information, and the second information may be understood as private key information. Alternatively, the first key may be a private key, and the second key may be a public key. The first information may be understood as private key information, and the second information may be understood as public key information. For example, a public key and a private key corresponding to the public key form an asymmetric key pair.

When the first information is the public key information, and the second information is the private key information, the method in the third aspect may also be described as follows.

An embodiment of this application provides a communication method. The method includes: sending private key information to a network device, where the private key information includes at least one private key and at least one public key corresponding to the at least one private key; and sending public key information to the network device or a terminal device, where the public key information includes the at least one public key.

A variation of the foregoing method is: sending private key information to a network device, where the private key information includes at least one private key and an index of the at least one private key; and sending public key information to a terminal device, where the public key information includes at least one public key and an index of the at least one public key. The at least one private key is in a one-to-one correspondence with the at least one public key, the at least one private key includes a first private key, and an index of the first private key is the same as an index of a first public key corresponding to the first private key.

In a possible design, the method further includes: sending, by a core network device, indication information to the network device or the terminal device, where the indication information is used to indicate a valid area to which the public key information is applicable.

In a possible design, the indication information includes an identifier of the valid area to which the public key information is applicable, where the identifier of the valid area to which the public key information is applicable includes at least one of the following: a public land mobile network identifier; a radio access network notification area identifier; a tracking area identity; and a cell identifier.

In a possible design, the indication information is used to indicate that the valid area to which the public key information is applicable is a tracking area list of the terminal device, or the indication information is used to indicate that the valid area to which the public key information is applicable is a radio access network notification area of the terminal device.

According to a fourth aspect, this application provides an apparatus. The apparatus includes a memory, a processor, and a communication interface. The memory is configured to store computer instructions. The communication interface is configured to communicate with another communication apparatus. The processor is connected to the memory and the communication interface, and is configured to execute the computer instructions, to perform the method according to any one of the first aspect to the third aspect or the optional implementations of any one of the aspects.

In a possible design, the apparatus includes one or more processors and a communication unit. The one or more processors are configured to support the apparatus in performing a corresponding function of the terminal device in the foregoing method. For example, if determining that the first public key is valid, integrity of the first system information is verified by using the first public key. The communication unit is configured to support the apparatus in communicating with another device, to implement a receiving and/or sending function, for example, receiving the first system information from the first network device.

Optionally, the apparatus may further include one or more memories. The memory is configured to be coupled to the processor, and the memory stores program instructions and/or data necessary for the apparatus. The one or more memories may be integrated with the processor, or may be disposed independent of the processor. This is not limited in this application.

The apparatus may be an intelligent terminal, a wearable device, or the like. The communication unit may be a transceiver or a transceiver circuit. Optionally, the transceiver may alternatively be an input/output circuit or an interface.

The apparatus may alternatively be a communication chip. The communication unit may be an input/output circuit or an interface of the communication chip.

In another possible design, the apparatus includes a transceiver, a processor, and a memory. The processor is configured to control the transceiver to receive and send a signal, and the memory is configured to store a computer program. The processor is configured to run the computer program in the memory, so that the apparatus performs the method performed by the terminal device in any one of the possible implementations of the aspects.

In a possible design, the apparatus includes one or more processors and a communication unit. The one or more processors are configured to support the apparatus in performing a corresponding function of the network device in the foregoing method, for example, performing integrity protection on the first system information by using the first private key. The communication unit is configured to support the apparatus in communicating with another device, to implement a receiving and/or sending function, for example, sending the first system information.

Optionally, the apparatus may further include one or more memories. The memory is coupled to the processor, and the memory stores program instructions and/or data necessary for the network device. The one or more memories may be integrated with the processor, or may be disposed independent of the processor. This is not limited in this application.

The apparatus may be a base station, for example, a gNB or a TRP, and the communication unit may be a transceiver, a transceiver circuit, or a communication interface. The communication unit may be configured to communicate with another base station, communicate with a terminal device, or communicate with a core network device. Optionally, the transceiver may alternatively be an input/output circuit or an interface.

The apparatus may alternatively be a communication chip. The communication unit may be an input/output circuit or an interface of the communication chip.

The apparatus may alternatively be a core network device, for example, an AMP. The communication unit may be a communication interface, configured to communicate with another core network device or a network device. Optionally, the communication interface may be an input/output circuit or interface.

The apparatus may alternatively be a chip in a core network device. The communication unit may be an input/output circuit or an interface of the chip.

In another possible design, the apparatus includes a transceiver, a processor, and a memory. The processor is configured to control the transceiver to receive and send a signal, and the memory is configured to store a computer program. The processor is configured to run the computer program in the memory, so that the apparatus performs the method performed by the network device in any one of the possible implementations of the aspects.

According to a fifth aspect, an embodiment of this application provides a communication system. The communication system includes one or a combination of more of the terminal device, the network device, and the core network device.

According to a sixth aspect, a computer-readable storage medium is provided, configured to store a computer program. The computer program includes instructions used to perform the method according to any one of the possible designs of the first aspect to the third aspect.

According to a seventh aspect, an embodiment of this application provides a computer-readable storage medium, configured to store a computer program. The computer program includes instructions used to perform the method according to any one of the possible designs of the first aspect to the third aspect.

According to an eighth aspect, an embodiment of this application provides a computer program product. The computer program product includes computer program code, and when the computer program code is run on a computer, the computer is enabled to perform the method according to any one of the possible designs of the first aspect to the third aspect.

DESCRIPTION OF EMBODIMENTS

The following describes the technical solutions in the embodiments of this application with reference to the accompanying drawings in the embodiments of this application.

Figure 1:
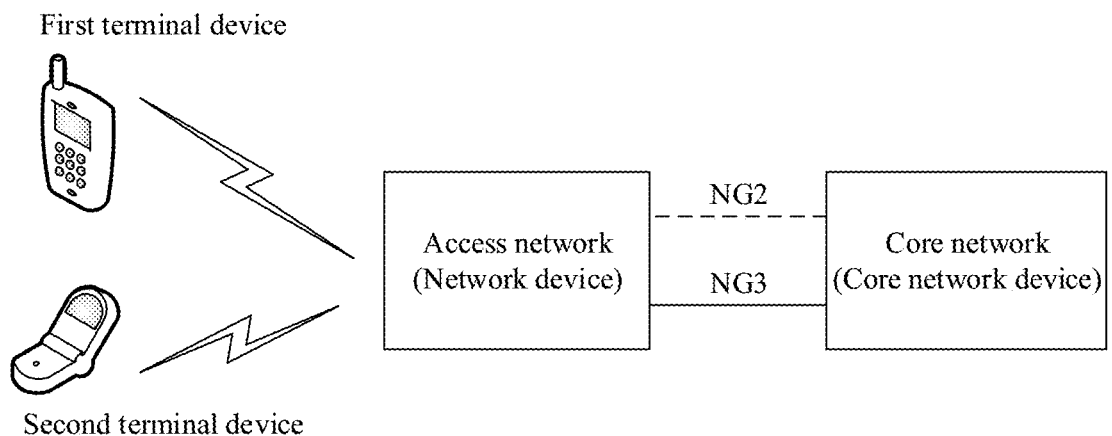
FIG. 1 is a schematic diagram of a system architecture to which an embodiment of this application is applicable.

FIG. 1 is, for example, a schematic diagram of a system architecture to which an embodiment of this application is applicable. The system architecture includes a terminal device (including a first terminal device and a second terminal device), an access network (access network, AN), and a core network (Core). Devices in AN and Core can be logically divided into user plane and control plane. The control plane is responsible for mobile network management, and the user plane is responsible for service data transmission. For example, in the system architecture shown in FIG. 1, an NG2 reference point is located between the RAN control plane and the Core control plane, and an NG3 reference point is located between the RAN user plane and the Core user plane.

The terminal device is a device having a wireless transceiver function, and is an entry for a mobile user to interact with a network. The terminal device can provide a basic computing capability and a storage capability, display a service window to a user, and receive operation input from the user. In a 5G communication network, a terminal device may establish a signal connection and a data connection to a network device by using a new radio (new radio, NR) technology, to transmit a control signal and service data to the network.

For example, the terminal device may be deployed on land, including an indoor device, an outdoor device, a handheld device, a wearable device, or a vehicle-mounted device; or may be deployed on a water surface (for example, on a steamboat); or may be deployed in the air (for example, on a plane, a balloon, or a satellite). The terminal device may be a mobile phone (mobile phone), a tablet computer (Pad), a computer having a wireless transceiver function, a virtual reality (virtual reality, VR) terminal device, an augmented reality (augmented reality, AR) terminal device, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), or the like. An application scenario is not limited in the embodiments of this application. The terminal device may also be sometimes referred to as user equipment (user equipment, UE), a mobile station, a remote station, and the like. A specific technology, a device form, and a name that are used by the terminal device are not limited in the embodiments of this application.

The access network may be a radio access network (radio access network, RAN), and a network device may be deployed in the access network. The network device is an access device used by the terminal device to access a communication system in a wireless manner, and may be a NodeB (NodeB), an evolved NodeB (evolved NodeB, eNodeB), a transmission reception point (transmission reception point, TRP), a next generation NodeB (next generation NodeB, gNB) in a 5G mobile communication system, a base station in a future mobile communication system, an access node in a wireless-fidelity (wireless-fidelity, Wi-Fi) system, or the like; or may be a module or a unit that completes some functions of a base station, for example, may be a central unit (central unit, CU) or a distributed unit (distributed unit, DU). A specific technology and a specific device form that are used by the network device are not limited in the embodiments of this application.

One or more core network devices that are responsible for maintaining subscription data of a mobile network, managing the mobile network, and providing functions such as session management, mobility management, policy management, and security authentication for a terminal device may be deployed in the core network. For example, the network device provides network access authentication for the terminal device when the terminal device is attached; allocates a network resource to the terminal device when the terminal device has a service request; updates a network resource for the terminal device when the terminal device moves; provides a fast recovery mechanism for the terminal device when the terminal device is idle; releases a network resource for the terminal device when the terminal device detaches; and provides a data routing function for the terminal device when the terminal device has service data, for example, forwards uplink data to a data network, or receives downlink data from a data network and forwards downlink data to the network device.

For example, the core network device may be an access management device (or referred to as an access management network element), and is mainly responsible for access management and mobility management of the terminal device, for example, responsible for status maintenance of the terminal device, accessibility management of the terminal device, forwarding of a mobility management non-access-stratum (mobility management non-access-stratum, MM NAS) message, and forwarding of a session management (session management, SM) N2 message. In actual application, the access management device may implement a mobility management function in an MME in an LTE network framework, and may further implement an access management function. In a 5G communication system, the access management device may be an access and mobility management function (access and mobility management function, AMF).

It should be noted that the foregoing illustrated system architecture is applicable to communication systems of various radio access technologies, for example, a long term evolution (long term evolution, LTE) communication system, a fifth generation (5th generation, 5G) communication system, and another possible communication system.

The system architecture and a service scenario that are described in the embodiments of this application are intended to describe the technical solutions in the embodiments of this application more clearly, and do not constitute a limitation on the technical solutions provided in the embodiments of this application. A person of ordinary skill in the art may learn that: With evolution of the communication system architecture and emergence of new service scenarios, the technical solutions provided in the embodiments of this application are also applicable to similar technical problems.

The following describes some communication terms used in the embodiments of this application.

(1) System information: The system information may be information sent by a network device to a terminal device in a cell in a wireless communication system. The information may include cell-level information of the cell, and is valid for all terminal devices in the cell. Generally, the network device may send the system information in a broadcast manner. Alternatively, the system information may alternatively be information sent by a scheduling group header on a sidelink (sidelink) resource to a terminal device served by the scheduling group header. The information may include information about an area served by the scheduling group header. In this case, for the terminal device in the scheduling group, a function of the scheduling group header is similar to a function of the network device. Generally, the scheduling group header may send the system information in a broadcast manner.

The system information may include one master information block (master information block, MIB) and at least one system information block (system information block, SIB). A SIB 1 includes information required for the terminal device to access the cell and scheduling information of another SIB. Generally, when receiving the system information, the terminal device may first receive an MIB, then receive a SIB 1, and then receive other information (for example, a SIB 2 and a SIB 3) in the system information.

For example, the SIB 1 may include a field: a ValueTag field, used to indicate whether the system information is updated. When the system information is updated, the network device increases the ValueTag in the original system information by 1, places the ValueTag obtained after the ValueTag is increased by 1 in the SIB 1 of the updated system information, and sends the ValueTag to the terminal device. After receiving the SIB 1 in the system information, the terminal device determines whether the ValueTag in the SIB 1 is the same as a previously stored ValueTag. If the ValueTag in the SIB 1 and the previously stored ValueTag are different, the terminal device determines that the system information has been updated, and continues to receive subsequent system information (for example, the SIB 2 and the SIB 3). If the ValueTag in the SIB 1 and the previously stored ValueTag are the same, the terminal device determines that the system information is not updated, and stops receiving subsequent system information (for example, the SIB 2 and the SIB 3).

(2) Public land mobile network (public land mobile network, PLMN): The PLMN includes a mobile country code (mobile country code, MCC) and a mobile network code (mobile network code, MNC). Each operator has its own PLMN.

(3) Radio access network notification area (radio access network notification area, RNA): The radio access network notification area may also be referred to as an air interface indication area. For example, a network device may configure an RNA for a terminal device. In an example, a configuration form of the RNA may be at least one cell identifier, at least one tracking area code (TA code, TAC), at least one TAC and at least one radio access network notification area code (RNA code, RANAC), or at least one private network identifier. In this embodiment of this application, an RNA identifier may be information used to identify the RNA. For example, the RNA identifier may include at least one cell identifier, at least one TAC, at least one TAC and at least one RANAC, or at least one private network identifier.

The terminal device may trigger a radio access network notification area update (RAN notification area update, RNAU), to notify a network side whether the terminal device moves out of a range of the RNA. For example, if the terminal device moves out of the range of the RNA, the terminal device may trigger the RNAU. For another example, if a timer that triggers a periodic RNAU expires, the terminal may trigger the RNAU.

(4) Tracking area (tracking area, TA): The tracking area may also be referred to as a core network indication area. A range of the TA may be configured by a core network device. For example, the core network device may configure a tracking area list for the terminal device, and the tracking area list may include a group of tracking area identities. The tracking area identity may be information used to identify a tracking area, for example, a TAC or a tracking area identity (tracking area identity, TAI). The TAI may be a global number and includes a PLMN identifier and a TAC. Generally, an area identified by a RANAC is less than or equal to an area identified by the TAC, or an area identified by the TAC may include at least one area identified by the RANAC.

The terminal device may trigger a tracking area update (tracking area update, TAU), to notify a network side whether the terminal device moves out of an area corresponding to the tracking area list. For example, the tracking area list of the terminal device is a tracking area list 1, and if the terminal moves out of an area corresponding to the tracking area list 1, the terminal device may trigger the TAU. For another example, if a timer that triggers a periodic TAU expires, the terminal device may trigger the TAU.

(5) State of the terminal device: In a possible manner, the terminal device may have three states, including a connected (connected) state, an idle (idle) state, and an inactive (inactive) state, where the inactive state may also be referred to as a non-active state, a deactivated state, an inactivated state, or the like. When the terminal device is in the connected state, the terminal device is in a normal working state, that is, signaling, user data, and the like may be sent and received between a network side and the terminal device. When the terminal device enters the idle state from the connected state, the terminal device and the network device generally delete a context of the terminal device. In 5G, the inactive state is introduced. When the terminal device enters the inactive state from the connected state, the network device suspends the terminal device. In this case, the terminal device retains the context. Because the context is retained on the terminal device, compared with the terminal device entering the connected state from the idle state, the terminal device enters the connected state more quickly from the inactive state.

(6) Private network identifier: A private network is a network that provides a service only for a terminal device that has subscription information with the network. Generally, the private network allows only the terminal device that has subscription information with the network to camp on the private network. In addition to the PLMN identifier, the private network further needs to be marked by using the private network identifier. The private network identifier may include a non-public network identifier (non-public network identifier, NPN ID) and/or a closed access group identifier (closed access group identifier, CAG ID). For example, the terminal device may determine, based on the PLMN identifier and the private network identifier in subscription information of the terminal device, whether the terminal device can camp on a specific private network cell. For example, a PLMN identifier subscribed by the terminal device is a PLMN ID 1, and a private network identifier is a CAG ID 1. If a private network cell 1 sends the PLMN ID 1 and the CAG ID 1, the terminal device may camp on the private network cell 1 or be handed over to the private network cell 1 to perform service transmission. If a private network cell 2 sends the PLMN ID 1 and a CAG ID 2, the terminal device cannot camp on the private network cell 2 or be handed over to the private network cell 2.

(7) Sidelink (sidelink, SL) communication: The sidelink communication is a technology that allows terminal devices to communicate with each other, and a resource used to carry communication of the terminal devices may be referred to as a sidelink resource. Because the sidelink communication can implement direct communication between different terminal devices, a relatively high data rate, a relatively low latency, and relatively low power consumption can be implemented. Sidelink communication may include, for example, vehicle-to-vehicle (vehicle-to-vehicle), vehicle-to-infrastructure (vehicle-to-infrastructure), and vehicle-to-pedestrian (vehicle-to-pedestrians) communication.

(8) Various numbers such as "first" and "second" in the embodiments of this application are merely used for differentiation for ease of description, and are not used to limit the scope of the embodiments of this application or represent a sequence. The term "and/or" describes an association relationship for describing associated objects and represents that three relationships may exist. For example, A and/or B may represent the following three cases: Only A exists, both A and B exist, and only B exists. The term "at least one" means one or more. At least two means two or more. "At least one" or a similar expression thereof means any combination of the items, including any combination of one item (piece) or a plurality of items (pieces). For example, at least one (piece or type) of a, b, or c may indicate: a, b, c, a and b, a and c, b and c, or a, b, and c, where a, b, and c may be singular or plural.

The following describes in detail the embodiments of this application.

In the system architecture shown in FIG. 1, a network device may notify, by using system information, a terminal device within coverage of the network device of various network-related information. Currently, no security protection is performed on the system information. Therefore, the terminal device cannot identify validity of the received system information. To enable the terminal device to identify validity of the system information, it may be considered to introduce a key mechanism to perform integrity protection on the system information, for example, introduce an asymmetric key mechanism to perform integrity protection on the system information. The asymmetric key mechanism means that a public key and a private key are paired. When a sender performs integrity protection on information by using the public key, a receiver may verify integrity of the information by using the paired private key; or when a sender performs integrity protection on information by using the private key, a receiver may verify integrity of the information by using the paired public key. The public key refers to a key that can be used between a plurality of devices, or even a key that can be sent publicly. The private key is a key that is dedicated to one or some devices and cannot be publicly transmitted over an air interface.

An example in which a sender performs integrity protection on system information by using the private key, and a receiver verifies integrity of the system information by using the paired public key is used. The sender may use an integrity protection algorithm to calculate a message authentication code for integrity (message authentication code for integrity, MAC-I) of the system information based on the private key (to be specific, the private key is an input of the integrity protection algorithm, and the MAC-I is an output of the integrity protection algorithm. In another possible example, the integrity protection algorithm may further include another input other than the private key. This is not specifically limited), include the message authentication code for integrity in the system information, and send the system information to the receiver.

Correspondingly, a specific mechanism in which the receiver performs integrity protection verification on the system information or the receiver verifies integrity of the system information may be: The receiver calculates an expected MAC-I (expected MAC-I or XMAC-I) based on the public key by using a same integrity protection algorithm, and compares the XMAC-I with the MAC-I. If the XMAC-I is the same as the MAC-I, the system information is considered not to be tampered with, that is, integrity verification on the system information succeeds. If the XMAC-I is different from the MAC-I, the system information is considered to be tampered with, that is, integrity verification on the system information fails.

For example, a possible solution in which integrity protection is performed on the system information by using the asymmetric key mechanism is as follows: After a terminal device accesses a cell in a TA, a core network device may send a public key of the TA to the terminal device, and the public key of the TA is applicable to the cell in the TA. A private key corresponding to the public key of the TA is configured on the network device. In this way, when sending the system information, the network device may perform integrity protection on the system information by using the private key corresponding to the public key of the TA, and the terminal device may verify integrity of the received system information by using the received public key.

Figure 2:
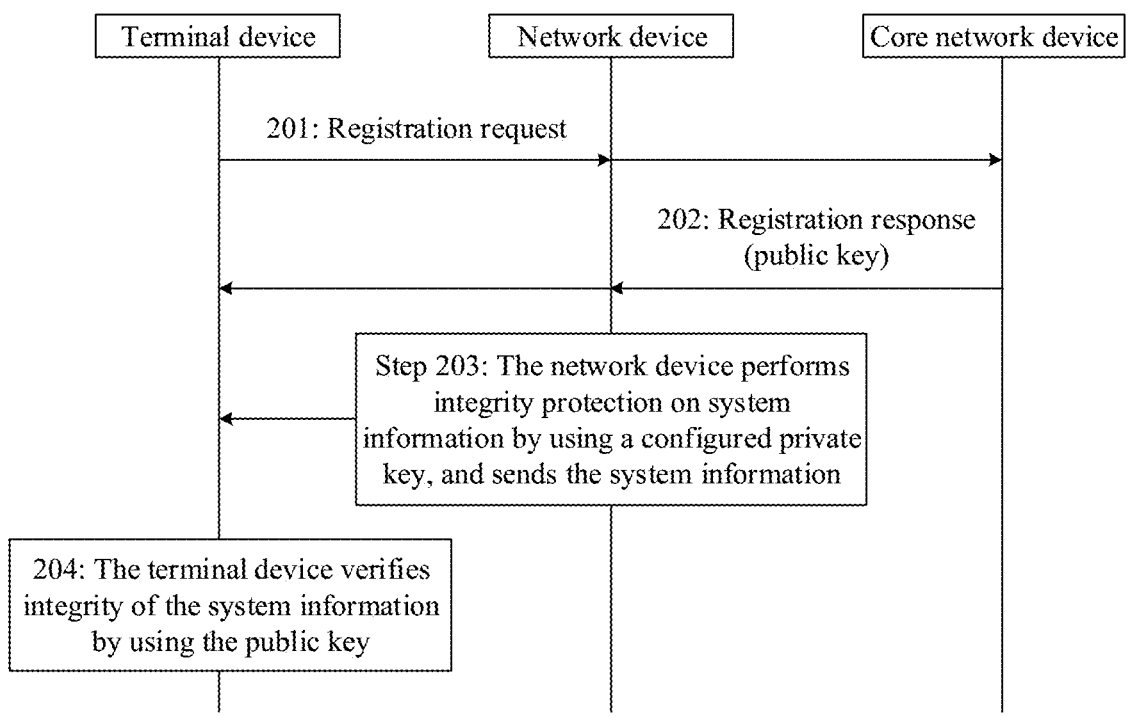
FIG. 2 is a schematic diagram of a possible solution for performing integrity protection on system information by using an asymmetric key mechanism according to an embodiment of this application.

FIG. 2 is an example of a possible implementation procedure of the solution. As shown in FIG. 2, the method includes the following steps.

Step 201: A terminal device sends a registration request to a core network device through a network device, where the registration request may carry an identifier of the terminal device.

Step 202: After verifying that an identity of the terminal device is valid, the core network device may accept the registration request of the terminal device, and send a registration response indicating successful registration to the terminal device through the network device, where the registration response may include a public key. For example, the registration response may further include at least one TA identifier applicable to the public key (where the public key is valid within the TA to which the public key is applicable).

Step 203: The network device performs integrity protection on the system information by using the configured private key, and sends the system information. For example, the network device may further send the TA identifier. The private key configured on the network device may be a private key sent by the core network device to the network device.

In other words, after determining, for a specific TA, the public key and the private key of the TA, the core network device may send the private key to a network device in the TA, and after receiving a registration request of a terminal device registered with the TA, send the public key of the TA to the terminal device by using a registration response.

Step 204: The terminal device verifies integrity of the system information by using the public key. For example, the terminal device may receive the TA identifier sent by the network device, determine, based on the public key and the TA identifier applicable to the public key (where the public key corresponds to the TA identifier applicable to the public key), the public key corresponding to the TA identifier sent by the network device, and verify integrity of the system information by using the determined public key.

For example, the terminal device moves to a TA 1, and sends a registration request to the core network device. The core network device returns a registration response to the terminal device based on the registration request, where the registration response includes a public key a. In this case, the terminal device receives system information a sent by the network device (where integrity protection is performed on the system information a based on a private key a corresponding to the public key a). Then, the terminal device verifies the system information a by using the public key a. After moving to a TA 2, the terminal device may send a location update request to the core network device, and the core network device returns a public key b. After receiving the public key b, the terminal device may delete the public key a. In this case, the terminal device receives system information b sent by the network device (where integrity protection is performed on the system information b based on a private key b corresponding to public key b). Then, the terminal device verifies the system information b by using the public key b. In this example, the terminal device may store a public key. For example, after receiving a new public key, the terminal device may delete a previously stored public key.

For another example, the terminal device moves to a TA 1, and sends a registration request to the core network device. The core network device returns a registration response to the terminal device based on the registration request, where the registration response includes a public key a and a TA identifier (for example, a TA 1) to which the public key a is applicable. In this case, after receiving system information a sent by the network device (where integrity protection is performed on the system information a based on a private key a corresponding to public key a) and the TA identifier (that is, the TA 1), the terminal device determines that the public key corresponding to the TA 1 is the public key a, and verifies the system information a by using the public key a. After moving to a TA 2, the terminal device may send a location update request to the core network device, and the core network device returns a public key b and a TA identifier (for example, a TA 2) to which the public key b is applicable. In this case, the terminal device stores the public key a and the public key b. After receiving system information b sent by the network device (where integrity protection is performed on the system information b based on a private key b corresponding to public key b) and the TA identifier (that is, the TA 2), the terminal device determines that the public key corresponding to the TA 2 is the public key b, and verifies the system information b by using the public key b. In this example, the terminal device may store one or more public keys. For example, after receiving a new public key, the terminal device may not immediately delete a previously stored public key. For example, the terminal device may periodically delete a previously stored public key, for example, delete the public key at an interval of time.

According to the foregoing solution, when an asymmetric key needs to be changed, an implementation process is relatively complex. For example, because the at least one TA identifier corresponds to an asymmetric key pair (including a public key and a private key), if the private key is changed, all private keys of all base stations in the corresponding at least one TA need to be updated. If the public key is changed, because a terminal device may have entered an idle state or an inactive state, or even moved to another TA in a tracking area list, to ensure integrity of update of the public key, the terminal device needs to be paged in the tracking area list to update the public key.

In view of this, an embodiment of this application provides a communication method. For example, the method may include: A network device performs integrity protection on system information by using a first private key, and sends the system information, where the system information includes a first public key corresponding to the first private key and/or an index of the first public key corresponding to the first private key. Correspondingly, a terminal device receives the system information from the network device, and if determining that the first public key is valid, the terminal device verifies integrity of the system information by using the first public key. The network device described herein may be a genuine network device. According to this method, on one hand, the terminal device can effectively identify validity of the system information. On the other hand, because the system information includes the first public key and/or the index of the first public key, flexible update of an asymmetric key can be implemented.

Devices in the communication method according to the embodiments of this application may include a terminal device, a network device, and a core network device. In Embodiment 1, implementation of the terminal device is described from a perspective of the terminal device. In Embodiment 2, implementation of the network device is described from a perspective of the network device. In Embodiment 3, implementation of the core network device is described from a perspective of the core network device. In Embodiment 4, a possible procedure of interaction between the terminal device, the network device, and the core network device is described.

In the embodiments of this application, an example in which the sender performs integrity protection on the system information by using the private key, and the receiver verifies integrity of the system information by using the paired public key is used, or a scenario in which the sender performs integrity protection on the system information by using the public key, and the receiver verifies integrity of the system information by using the paired private key may also be applicable. That is, in the following description in the embodiments of this application, the private key is replaced with the public key, and correspondingly the public key is replaced with the private key. For example, "public key information" is replaced with "private key information", that "the public key information includes at least one public key and an index of the at least one public key" is replaced with "the private key information includes at least one private key and an index of the at least one private key", or that "the indication information is used to indicate a valid area to which the public key information is applicable" is replaced with "the indication information is used to indicate a valid area to which the private key information is applicable", so that a solution in which the sender performs integrity protection on the system information by using the public key, and the receiver verifies integrity of the system information by using the paired private key is obtained. Details are not specifically described.

Step numbers in the embodiments of this application are merely a possible example of an execution procedure, and do not constitute a limitation on an execution sequence of the steps. In the embodiments of this application, there is no strict execution sequence between steps that have no time sequence dependency relationship with each other.

It may be understood that in the embodiments of this application, the terminal device and/or the network device and/or the core network device may perform some or all steps in the embodiments of this application. These steps or operations are merely examples. In the embodiments of this application, other operations or variations of various operations may be further performed. In addition, the steps may be performed in a sequence different from a sequence presented in the embodiments of this application, and not all the operations in the embodiments of this application may be performed.

Embodiment 1

Figure 3:
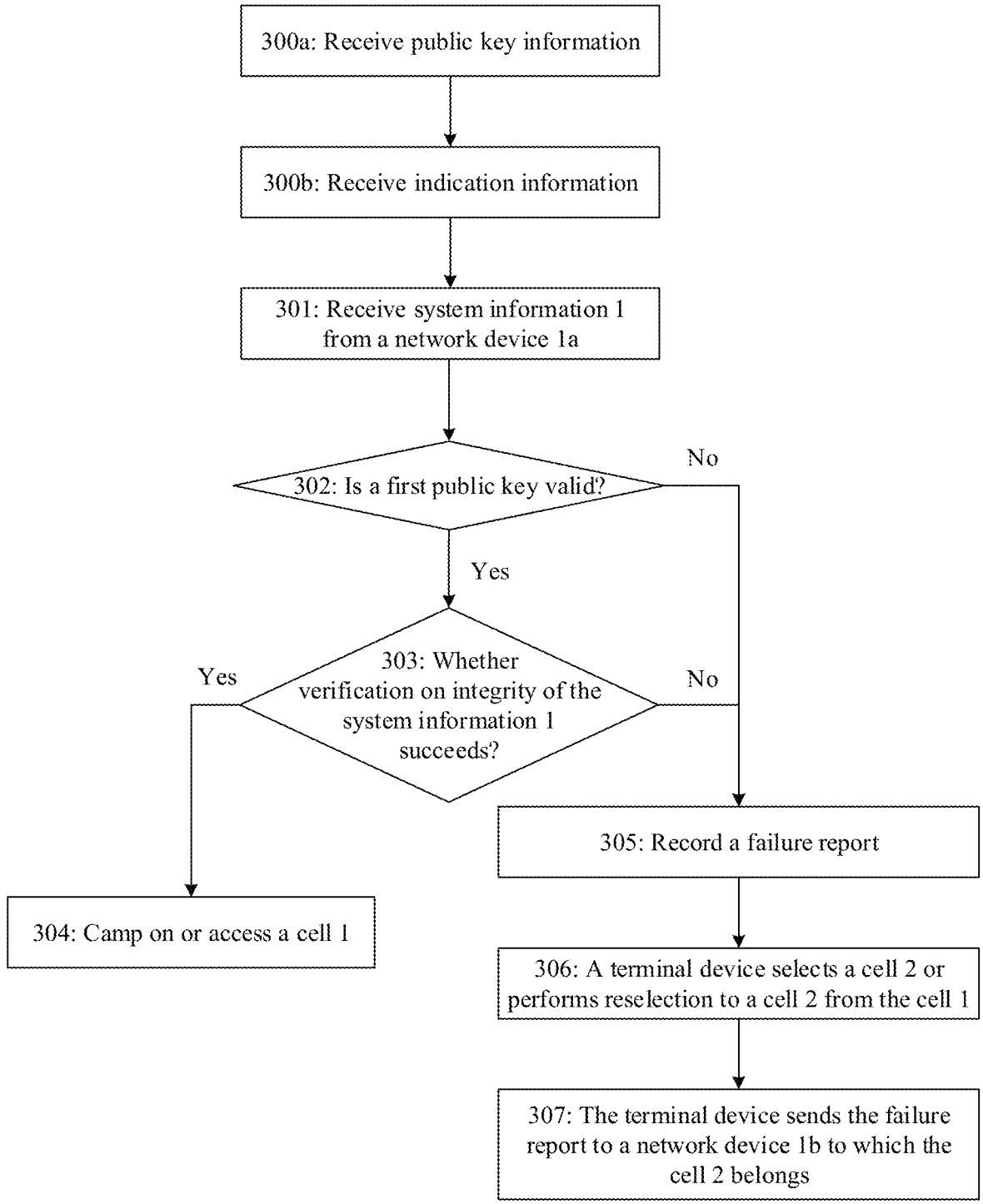
FIG. 3 is a schematic flowchart corresponding to a communication method according to Embodiment 1 of this application.

With reference to FIG. 3, the following describes implementation of a terminal device from a perspective of the terminal device. A network device 1a and a network device 1b may be genuine network devices, or may be fake network devices.

FIG. 3 is a schematic flowchart corresponding to a communication method according to Embodiment 1 of this application. As shown in FIG. 3, the method includes the following steps.

Step 300a: The terminal device receives public key information, where the public key information includes at least one public key and an index of the at least one public key.

Herein, there may be a plurality of implementations in which the terminal device receives the public key information. For example, the terminal device may receive the public key information from a core network device or a network device 0 (which may be a genuine network device). In a possible implementation, the terminal device may send a first request to the core network device through the network device 0. Correspondingly, after verifying that an identity of the terminal device is valid, the core network device may accept the first request of the terminal device, and send a first response to the terminal device through the network device 0, where the first response includes the public key information. This case may be understood as that the terminal device receives the public key information from the core network device. The first request may be a registration request message or a location update request message, and correspondingly the first response may be a registration accept message or a location update accept message. In another possible implementation, the core network device sends the public key information to the network device 0, and the network device 0 receives and stores the public key information. Subsequently, after receiving a second request of the terminal device, the network device 0 may send the public key information to the terminal device by using a radio resource control (radio resource control, RRC) message. This case may be understood as that the terminal device receives the public key information from the network device 0. The second request may be a connection establishment request, a resume request, or a reestablishment request.

Optionally, the public key information may further include integrity protection algorithm information.

Step 300b: The terminal device receives indication information, where the indication information is used to indicate a valid area to which the public key information is applicable.

In a possible implementation, the indication information may include an identifier of the valid area to which the public key information is applicable. The public key information is valid within the valid area to which the public key information is applicable and is invalid beyond the valid area. The indication information and the public key information may be transmitted by using a same message, or may be transmitted by using different messages. When the indication information and the public key information are transmitted by using a same message, for example, the core network device sends a message, namely, the first response, to the terminal device based on the first request, where the first response includes the indication information and the public key information. For another example, the network device 0 sends an RRC message to the terminal device based on the second request, where the RRC message may include the indication information and the public key information. When the indication information and the public key information are sent by using different messages, for example, the core network device sends two messages, namely, a first response and a second response, to the terminal device based on the first request, where the first response includes the public key information, and the second response includes the indication information. For another example, the network device 0 sends two RRC messages to the terminal device based on the second request, where one RRC message includes the public key information, and the other RRC message includes the indication information.

The identifier of the valid area includes at least one of the following: a PLMN identifier, an RNA identifier, a TA identifier, a cell identifier, and a private network identifier. The cell identifier may be information used to identify a cell, for example, may include at least one of a cell global identifier (cell global identifier, CGI), a physical cell identifier (physical cell identifier, PCI), a frequency, and a cell identifier (cell identifier). For example, the indication information includes a PLMN identifier. For example, the PLMN identifier is a PLMN 1, indicating that when a PLMN selected by the terminal device is the PLMN 1, the public key information is valid. Alternatively, the indication information includes a PLMN identifier and a RANAC. For example, the PLMN identifier is a PLMN 1, and the RANAC is a RANAC 1, indicating that when a PLMN selected by the terminal device is the PLMN 1, if the terminal device is located in an area identified by the RANAC 1, the public key information is valid. Alternatively, the indication information includes a PLMN identifier, a RANAC, and a TAC. For example, the PLMN identifier is a PLMN 1, the RANAC is a RANAC 1, and the TAC is a TAC 1, indicating that when a PLMN selected by the terminal device is the PLMN 1, if the terminal device is located in an area identified by the RANAC 1 in the TAC 1, the public key information is valid. Alternatively, the indication information includes a PLMN identifier, a RANAC, a TAC, and a cell identifier. For example, the PLMN identifier is a PLMN 1, the RANAC is a RANAC 1, the TAC is a TAC 1, and the cell identifier is a cell 1, indicating that when a PLMN selected by the terminal device is the PLMN 1, if the terminal device is located in the cell 1 in an area identified by the RANAC 1 and the TAC 1, the public key information is valid.

In another possible implementation, the indication information is used to indicate that the valid area to which the public key information is applicable is a tracking area list of the terminal device, or the indication information is used to indicate that the valid area to which the public key information is applicable is an RNA of the terminal device. It may alternatively be described as: The indication information is used to indicate that an identifier of the valid area to which the public key information is applicable is the same as a tracking area identifier included in a tracking area list of the terminal device, or the indication information is used to indicate that an identifier of the valid area to which the public key information is applicable is the same as an RNA identifier of the terminal device. In this implementation, the indication information may include one bit. In an example, when a value of the bit is "1", it indicates that the valid area to which the public key information is applicable is the tracking area list of the terminal device; when a value of the bit is "0", it indicates that the valid area to which the public key information is applicable is the RNA of the terminal device. In another possible example, the foregoing "1" or "0" may have other meanings. A specific meaning indicated by the value of the bit is not limited in this embodiment of this application. For example, the indication information and the public key information may be transmitted by using a same message, or may be transmitted by using different messages. For details, refer to descriptions about the indication information in the foregoing implementation.

For the foregoing two implementations, if the terminal device moves out of the valid area to which the public key information is applicable, the terminal device may send a request message to the network device or the core network device. Correspondingly, the network device or the core network device may send, to the terminal device based on an area in which the terminal device is currently located, public key information applicable to the area in which the terminal device is currently located. For example, the identifier of the valid area to which the public key information is applicable is a PLMN identifier and a RANAC. For example, the PLMN identifier is a PLMN 1, and the RANAC is a RANAC 1. When the PLMN identifier selected by the terminal device does not change, but the terminal device moves from an area identified by the RANAC 1 to an area identified by a RANAC 2, the terminal device may trigger an RNAU. Correspondingly, the network device may determine, based on the RNAU, that the area in which the terminal device is currently located is the area identified by the RANAC 2, and send public key information applicable to the area identified by the RANAC 2 to the terminal device.

It should be noted that step 300a and step 300b are optional steps. In a specific implementation, step 300a and step 300b may not be performed (for example, the terminal device stores at least one default public key and an index of the at least one public key. Therefore, step 300a and step 300b do not need to be performed again). Alternatively, step 300a is performed and step 300b is not performed (for example, the valid area to which the public key information is applicable may be indicated through definition in a protocol. For example, it is defined in a protocol that the valid area to which the public key information is applicable is the tracking area list or the radio access network notification area of the terminal device, or it is defined in a protocol that the valid area to which the public key information is applicable is a current serving cell of the terminal device, an area corresponding to a PLMN identifier corresponding to the current serving cell, or an area corresponding to a private network identifier corresponding to the current serving cell). This is not specifically limited.

Step 301: The terminal device receives system information 1 from the network device 1a, where the system information 1 includes a first public key and/or an index of the first public key. For example, if the terminal device accesses a cell 1, the terminal device may receive, in the cell 1, the system information 1 sent by the network device 1a. Optionally, the system information 1 may further include the integrity protection algorithm information. The system information 1 refers to some or all system information sent in the cell 1. The integrity protection algorithm information is used to indicate an integrity protection algorithm. For example, the integrity protection algorithm information may include an identifier or an index of the integrity protection algorithm. For example, the terminal device may store one or more integrity protection algorithms and corresponding indexes. After receiving the integrity protection algorithm information, the terminal device may determine a corresponding integrity protection algorithm based on an identifier or an index included in the integrity protection algorithm information.

Step 302: The terminal device determines whether the first public key is valid, and if the first public key is valid, performs step 303; if the first public key is invalid, performs step 305.

Herein, there may be a plurality of implementations in which the terminal device determines whether the first public key is valid. In a possible implementation, the terminal device may determine, based on the public key information, whether the first public key is valid. For example, the system information 1 includes the first public key. After parsing the system information 1 to obtain the first public key, the terminal device may determine that the first public key is valid if determining that the at least one public key included in the public key information includes the first public key. For another example, the system information 1 includes the index of the first public key. After parsing the system information 1 to obtain the index of the first public key, the terminal device may determine that the first public key is valid if determining that the index of the at least one public key included in the public key information includes the index of the first public key. For another example, the system information 1 includes the first public key and the index of the first public key. After parsing the system information 1 to obtain the first public key and the index of the first public key, the terminal device may determine that the first public key is valid if determining that the at least one public key includes the first public key or the index of the at least one public key includes the index of the first public key.

Optionally, the terminal device determines that the current cell 1 is located in the valid area to which the public key information is applicable, and further determines that the first public key is valid. For example, the indication information includes the identifier (that is, the PLMN 1) of the valid area to which the public key information is applicable, and the system information 1 includes the first public key. After receiving the system information 1, the terminal device may determine, based on the system information 1, a PLMN to which the cell 1 belongs. If the PLMN to which the cell 1 belongs is the PLMN 1, the terminal device may further determine whether the first public key is valid.

Step 303: The terminal device verifies integrity of the system information 1 by using the first public key, and if the verification succeeds, performs step 304; or if the verification fails, performs step 305 to step 307.

For example, the terminal device may obtain the integrity protection algorithm, and then verify integrity of the system information 1 by using the first public key and the integrity protection algorithm. The terminal device may obtain the integrity protection algorithm in a plurality of manners. For example, if the public key information includes the integrity protection algorithm information, the terminal device may obtain the integrity protection algorithm based on the public key information. For another example, if the system information 1 includes the integrity protection algorithm information, the terminal device may obtain the integrity protection algorithm based on the system information 1.

It may be understood that, in an example, if the public key information includes the integrity protection algorithm information, the system information 1 sent by the network device may no longer carry the integrity protection algorithm information. Alternatively, if the system information 1 sent by the network device carries the integrity protection algorithm information, the public key information may no longer carry the integrity protection algorithm information. In this manner, transmission resources can be effectively saved.

Step 304: The terminal device determines that the cell 1 is a genuine cell (or the network device 1a is a genuine network device), and the terminal device may camp on or access the cell 1.

Step 305: The terminal device records a failure report, where the failure report includes one or more of information about the cell 1, location information, and an exception cause. The location information may be location information of the terminal device, for example, location information of the terminal device when the terminal device records the failure report. The exception cause includes at least one of the following: integrity verification on the system information fails, the cell 1 is a fake cell, and the network device 1a is a fake network device. The information about the cell 1 may include at least one of a cell global identifier (cell global identifier, CGI), a physical cell identifier (physical cell identifier, PCI), a frequency, and a cell identifier (cell identifier) of the cell 1. It should be noted that the failure report may further include other possible information, for example, time information. This is not specifically limited.

In addition, in an example, if the terminal device determines that the verification fails, the terminal device may further start a timer. Within running time of the timer, the terminal device considers that the cell 1 is "access barred" or the terminal device considers that a priority of the cell 1 is the lowest. Duration of the timer may be a value received by the terminal device from the network device or the core network device, or a value predefined in a protocol. A sequence in which the terminal device records the failure report and the terminal device starts the timer is not limited in this embodiment of this application. For example, after acknowledging a failure, the terminal may simultaneously record the failure report and start the timer.

Step 306: The terminal device selects a cell 2 or performs reselection to a cell 2. For a specific manner of reselection, refer to the conventional technology. Details are not described herein again.

Step 307: The terminal device sends the failure report to the network device 1b to which the cell 2 belongs.

For example, after performing reselection to the cell 2, the terminal device may receive system information 2 in the cell 2, and perform integrity verification on the system information 2. The system information 2 refers to some or all system information sent in the cell 2. A specific verification manner is the same as a manner in which the terminal device performs integrity verification on the system information 1. If the verification succeeds, the terminal device may send the failure report to the network device 1b to which the cell 2 belongs. If the verification fails, it indicates that the cell 2 is a fake cell. In this case, the terminal device may select another cell or perform reselection to another cell.

For example, the failure report may include the information about the cell 1, the location information of the terminal device, and the exception cause. For example, because the cell 1 is the fake cell, information about the cell 1 may be the same as information about a genuine cell (for example, a cell 1a). In this case, the network device 1b may not determine whether the cell 1 is the fake cell or the cell 1a is the fake cell by using only the information about the cell 1. Therefore, when the failure report further includes the location information of the terminal device, the network device 1b may determine, based on the location information of the terminal device and the information about the cell 1, that the cell 1 is the fake cell. It may be understood that if the cell 1 is the fake cell, and the information about the cell 1 is different from information about another cell, the network device 1b may also determine, based only on the information about the cell 1, that the cell 1 is the fake cell.

It should be noted that: (1) In the foregoing embodiment, if the network device 1a is a genuine network device, the network device 0 and the network device 1a may be a same network device, or may be two different network devices in the valid area to which the public key information is applicable. If the network device 1a is a fake network device, the network device 0 and the network device 1a may be two different network devices in the valid area to which the public key information is applicable.

(2) The foregoing embodiment is described by using an example in which the public key information in step 300a includes the at least one public key and the index of the at least one public key. In another possible embodiment, the public key information in step 300a may alternatively include the at least one public key. In this case, the system information 1 may include the first public key.

(3) The foregoing embodiment is described by using an example in which the system information 1 in step 301 includes the first public key and/or the index of the first public key. In another possible embodiment, the system information 1 may not include the first public key and/or the index of the first public key. In this case, the following steps may be performed: Step 302': The terminal device sequentially performs integrity verification on the system information 1 by using public keys included in the public key information, and if verification succeeds by using one public key in the public key information, performs step 304; or if verification fails by using all the public keys in the public key information, performs step 305 to step 307. This case is briefly described as follows: For example, from a perspective of the core network device, the core network device may generate at least one public key and at least one private key, send the at least one private key to the network device, and send the at least one public key to the terminal device. From a perspective of the network device (the genuine network device), the network device may perform integrity protection on the system information by using one of the at least one private key, and send the system information, where the system information does not include a public key corresponding to the private key. From a perspective of the terminal device, the terminal device may perform step 302'.

(4) In the foregoing embodiment, an example in which the at least one public key included in the public key information is applicable to a same valid area is used for description. In another possible embodiment, the public key information may include a plurality of public keys, the plurality of public keys may be divided into a plurality of groups, and public keys included in each group are applicable to a same valid area.

Embodiment 2

Figure 4:
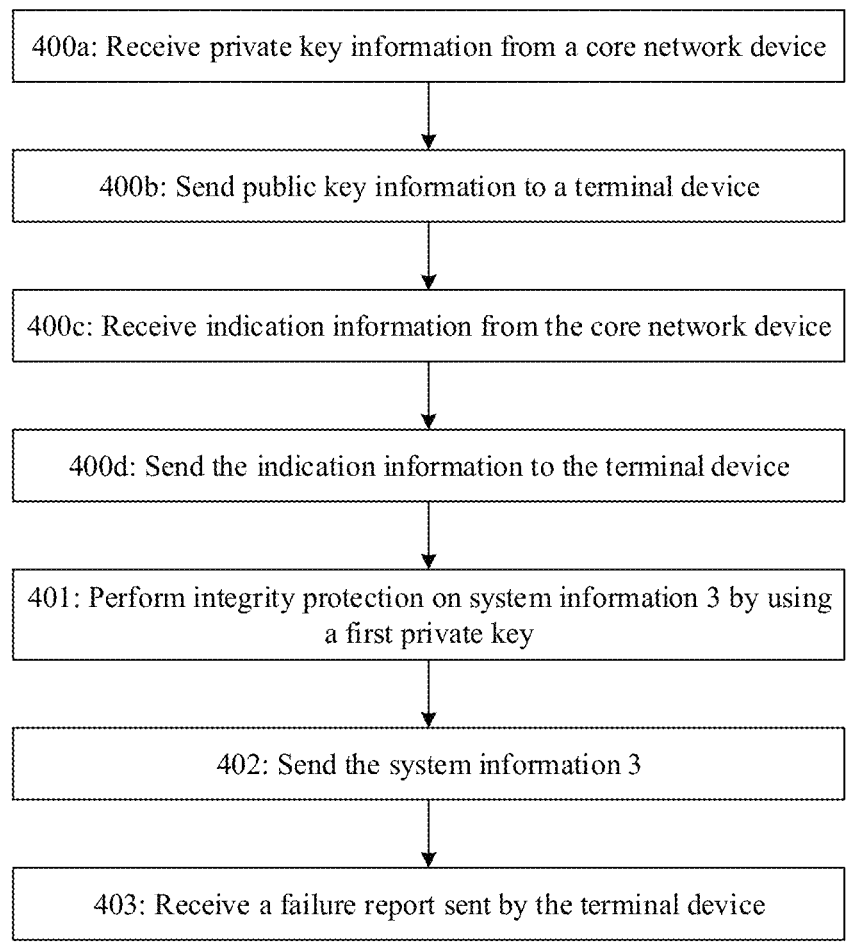
FIG. 4 is a schematic flowchart corresponding to a communication method according to Embodiment 2 of this application.
Figure 5:
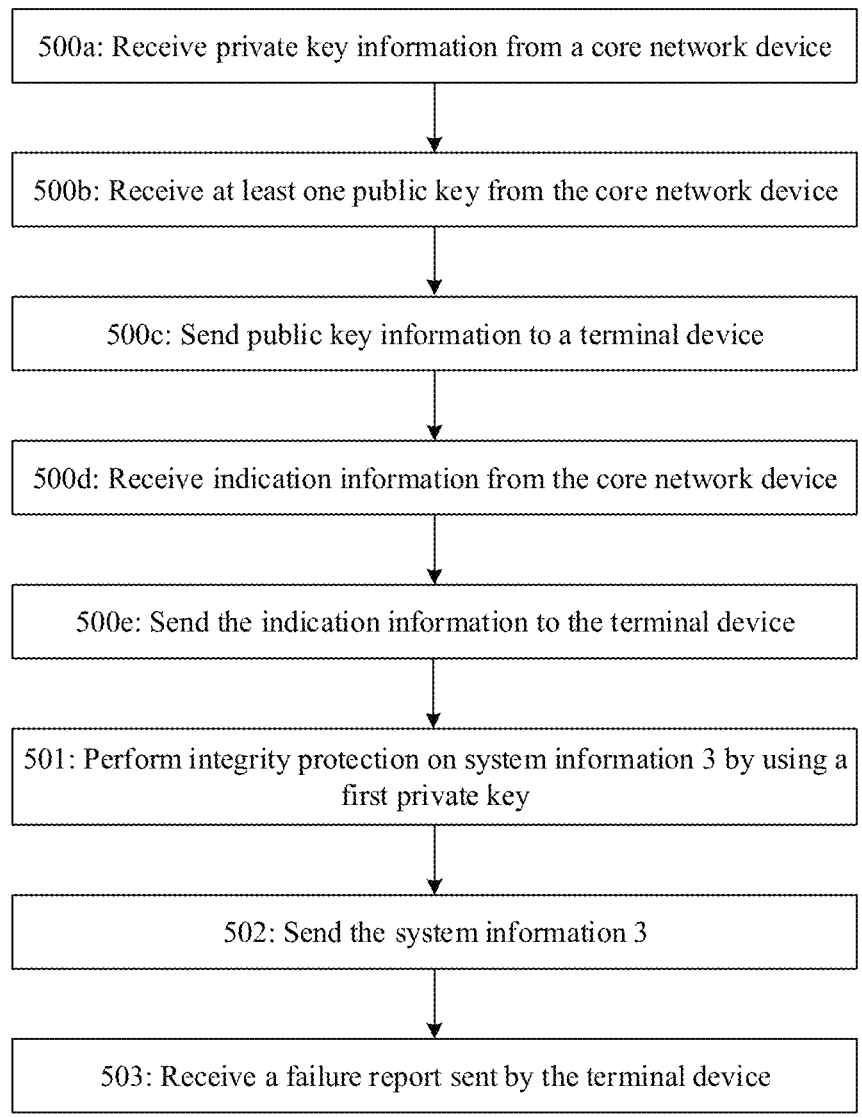
FIG. 5 is a schematic flowchart corresponding to another communication method according to Embodiment 2 of this application.

With reference to FIG. 4 and FIG. 5, the following describes implementation of a network device from a perspective of the network device. A network device 2a is a genuine network device.

FIG. 4 is a schematic flowchart corresponding to a communication method according to Embodiment 2 of this application. As shown in FIG. 4, the method includes the following steps.

Step 400a: The network device 2a receives private key information from a core network device, where the private key information includes at least one private key and at least one public key corresponding to the at least one private key. For example, the private key information includes n private keys (a private key 1, a private key 2, . . . , and a private key n) and n public keys (a public key 1, a public key 2, . . . , and a public key n) corresponding to the n private keys. Optionally, the network device 2a may further receive integrity protection algorithm information from the core network device.

Step 400b: The network device sends public key information to a terminal device, where the public key information includes the at least one public key, namely, a public key 1, a public key 2, . . . , and a public key n. Optionally, the public key information may further include the integrity protection algorithm information.

It should be noted that, an implementation in which the network device 2a performs step 400b may be one of the following: Manner 1: The core network device sends the public key information to the terminal device through the network device. In this case, the network device 2a transparently transmits the public key information, and does not perform parsing. Manner 2: The network device 2a may perform step 400b in the following manner: After obtaining, through parsing based on the private key information, the at least one private key and the at least one public key corresponding to the at least one private key, the network device 2a sends the at least one public key to the terminal device.

Step 400c: The network device 2a receives indication information from the core network device, where the indication information is used to indicate a valid area to which the public key information is applicable.

Step 400d: The network device 2a sends the indication information to the terminal device.

It should be noted that, in an example, step 400c and step 400d may be understood as: The core network device sends the indication information to the terminal device through the network device (in this case, the network device 2a transparently transmits the indication information, and does not perform parsing); or may be understood as: The network device 2a first receives the indication information from the core network device, and then sends the indication information to the terminal device (in this case, the network device can parse the indication information, that is, the indication information is not transparently transmitted as described above).

Step 401: The network device 2a performs integrity protection on system information 3 by using a first private key. Herein, the first private key may be one of the at least one private key. For example, the first private key is the private key 1.

Step 402: The network device 2a sends the system information 3, where the system information 3 includes a first public key corresponding to the first private key. Optionally, the system information 3 may further include the integrity protection algorithm information. The system information 3 refers to some or all of system information sent by a cell of the network device 2a.

Step 403: The network device 2a receives a failure report sent by the terminal device, where the failure report includes information about a cell 3, location information of the terminal device, and an exception cause. The location information of the terminal device may be location information of the terminal device when the terminal device records the failure report. The exception cause may include at least one of the following: integrity verification on the system information fails, the cell 3 is a fake cell, and a network device 2b to which the cell 3 belongs is a fake network device.

It should be noted that: (1) For specific descriptions of the indication information in step 400c and step 400d, refer to Embodiment 1.

(2) For step 400a and step 400c, the network device 2a may receive the private key information and the indication information from the core network device by using a same message or different messages. In other words, the private key information and the indication information may be transmitted by using a same message or by using different messages. For step 400b and step 400d, the network device may send the public key information and the indication information by using a same message or different messages. This is not specifically limited.

(3) Step 400a to step 400d are optional steps. In a specific implementation, step 400a to step 400d may not be performed, or some steps in step 400a to step 400d are performed. For example, step 400a and step 400b are performed, and step 400c and step 400d are not performed. This is not specifically limited. In addition, step 403 is also an optional step. In a specific implementation, step 403 may not be performed.

(4) In another possible embodiment, for example, the terminal device performs step 302', in step 402, the system information 3 sent by the network device 2a may not include the first public key corresponding to the first private key.

FIG. 5 is a schematic flowchart corresponding to another communication method according to Embodiment 2 of this application. As shown in FIG. 5, the method includes the following steps.

Step 500a: The network device 2a receives private key information from a core network device, where the private key information includes at least one private key and an index of the at least one private key. For example, the private key information includes n private keys (a private key 1, a private key 2, . . . , and a private key n) and indexes of the n private keys. Optionally, the network device 2a may further receive integrity protection algorithm information from the core network device.

Step 500b: The network device 2a receives at least one public key from the core network device. Herein, if the private key information includes the n private keys and the indexes of the n private keys, the at least one public key may be n public keys (a public key 1, a public key 2, . . . , and a public key n) corresponding to the n private keys.

Step 500c: The network device 2a sends public key information to a terminal device, where the public key information includes the at least one public key (namely, a public key 1, a public key 2, . . . , and a public key n) and an index of the at least one public key. Optionally, the public key information may further include the integrity protection algorithm information.

In this embodiment of this application, a public key and a corresponding private key form a key pair, and indexes of the public key and the corresponding private key are the same. A private key 1 is used as an example. The private key 1 corresponds to a public key 1, and an index of the private key 1 is the same as an index of the public key 1. Therefore, the index of the private key 1 may also be referred to as an index of a key pair (including the private key 1 and the public key 1) to which the private key 1 belongs, and the index of the public key 1 may also be referred to as an index of a key pair (including the private key 1 and the public key 1) to which the public key 1 belongs.

It should be noted that, if the core network device sends the public key information to the terminal device through the network device 2a, in an implementation, when performing step 500b and step 500c, the network device 2a transparently transmits the public key information, and does not perform parsing; in another implementation, when performing step 500b and step 500c, the network device 2a needs to obtain the at least one private key and the index of the at least one private key through parsing based on the private key information, and after receiving and parsing to obtain the at least one public key, the network device 2a sends the public key information to the terminal device.

In this embodiment of this application, the private key and the corresponding public key may form a key pair obtained based on an algorithm. For example, the core network device may send the private key information and the at least one public key to the network device 2a by using a same message (that is, step 500a and step 500b may both be performed). When sending the private key information and the at least one public key to the network device 2a, the core network device may indicate, in a plurality of manners, that a public key corresponds to a private key (or a public key corresponds to a private key). This is not specifically limited.

Step 500d: The network device 2a receives indication information from the core network device, where the indication information is used to indicate a valid area to which the public key information is applicable.

Step 500e: The network device 2a sends the indication information to the terminal device.

It should be noted that, in an example, step 500d and step 500e may be understood as: The core network device sends the indication information to the terminal device through the network device, and in this case, the network device 2a transparently transmits the indication information, and does not perform parsing; or may be understood as: The network device 2a first receives the indication information from the core network device, and then sends the indication information to the terminal device (in this case, the network device can parse the indication information, that is, the indication information is not transparently transmitted as described above).

Step 501: The network device 2a performs integrity protection on system information 3 by using a first private key. Herein, the first private key may be one of the at least one private key. For example, the first private key is the private key 1.

Step 502: The network device 2a sends the system information 3, where the system information 3 includes an index of the first private key or an index of a first public key (that is, the index of the private key 1 or the index of the public key 1). It may be understood that, from a perspective of the network device, the system information 3 includes the index of the first private key, and from a perspective of the terminal device, the system information 3 includes the index of the first public key. Optionally, the system information 3 may further include integrity protection algorithm information.

Step 503: The network device 2a receives a failure report sent by the terminal device, where the failure report includes information about a cell 3, location information of the terminal device, and an exception cause. The location information of the terminal device may be location information of the terminal device when the terminal device records the failure report. The exception cause includes at least one of the following: integrity verification on the system information fails, the cell 3 is a fake cell, and a network device 2b to which the cell 3 belongs is a fake network device.

It should be noted that: (1) For specific descriptions of the indication information in step 500d and step 500e, refer to Embodiment 1.

(2) For step 500a, step 500b, and step 500d, the network device 2a may receive the private key information, the at least one public key, and the indication information from the core network device by using a same message or different messages. In other words, the private key information, the at least one public key, and the indication information may be transmitted by using a same message or by using different messages. For step 500c and step 500e, the network device may send the public key information and the indication information by using a same message or different messages. This is not specifically limited.

(3) Step 500a to step 500e are optional steps. In a specific implementation, step 500a to step 500e may not be performed, or some steps in step 500a to step 500e are performed. For example, step 500a, step 500b, and step 500c are performed, and step 500d and step 500e are not performed. This is not specifically limited. For another example, step 500a is performed, and step 500b to step 500e are not performed. In addition, step 503 is also an optional step. In a specific implementation, step 503 may not be performed.

(4) In another possible embodiment, for example, the terminal device performs step 302', in step 502, the system information 3 sent by the network device 2a may not include the index of the first public key.

For the methods described in FIG. 4 and FIG. 5, if the network device 2a needs to change the private key for performing integrity protection on the system information, for example, change from the first private key to a second private key, correspondingly, the first public key included in the system information is changed to a second public key corresponding to the second private key. In this case, in an example, the network device 2a may indicate, by using a system information update procedure, the terminal device to perform integrity verification on the system information based on the second public key. For the system information update procedure, refer to the conventional technology. Details are not described herein again.

In the method described in FIG. 4, if the network device 2a performs step 400b, that is, the network device sends the public key information to the terminal device (with no transparent transmission), the network device may also generate an index of the at least one public key. Therefore, the public key information in step 400b carries the index of the at least one public key. For subsequent steps, refer to related descriptions in FIG. 5 (for example, step 501 to step 503).

Embodiment 3

Figure 6:
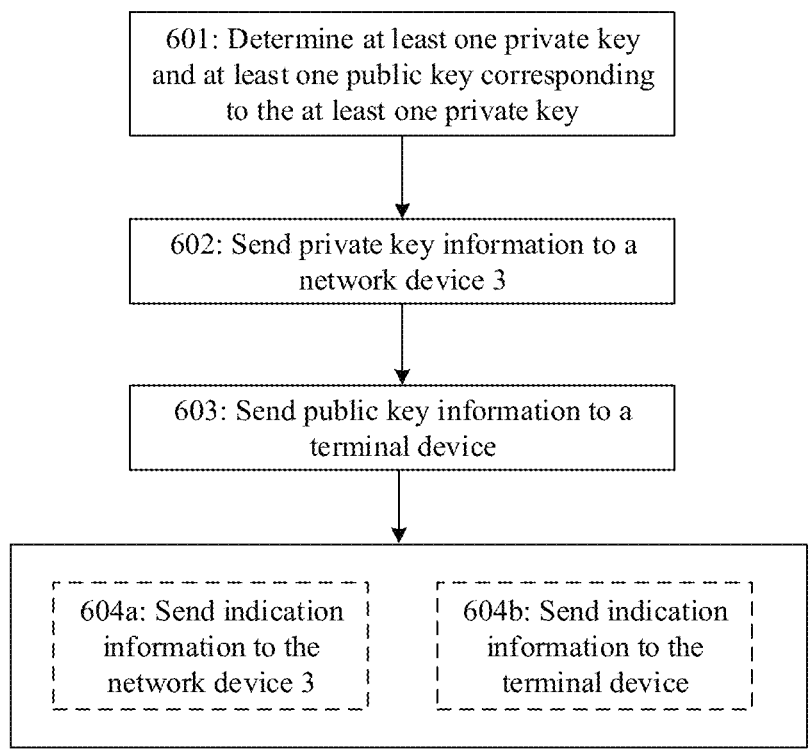
FIG. 6 is a schematic flowchart corresponding to a communication method according to Embodiment 3 of this application.
Figure 7:
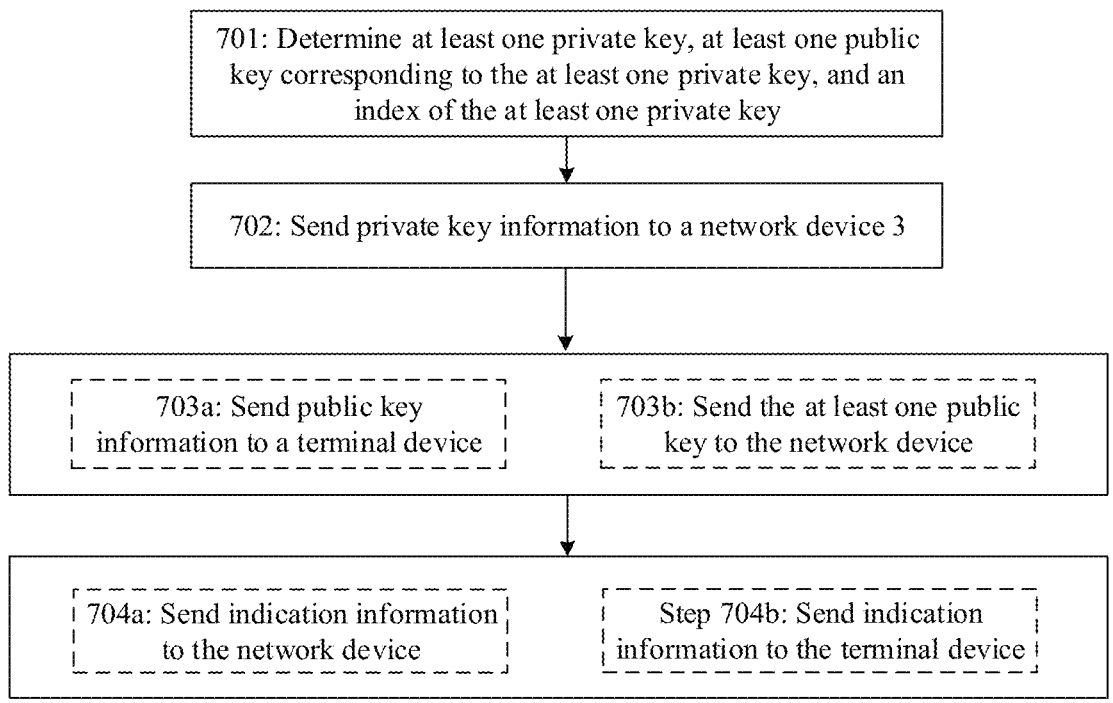
FIG. 7 is a schematic flowchart corresponding to another communication method according to Embodiment 3 of this application.

With reference to FIG. 6 and FIG. 7, the following describes implementation of a core network device from a perspective of the core network device. A network device 3 is a genuine network device.

FIG. 6 is a schematic flowchart corresponding to a communication method according to Embodiment 3 of this application. As shown in FIG. 6, the method includes the following steps.

Step 601: The core network device determines at least one private key and at least one public key corresponding to the at least one private key.

Step 602: The core network device sends private key information to the network device 3, where the private key information includes the at least one private key and the at least one public key corresponding to the at least one private key. Optionally, the core network device may further send integrity protection algorithm information to the network device 3.

Step 603: The core network device sends public key information to a terminal device through the network device 3 (in this case, the network device 3 transparently transmits the public key information), where the public key information includes the at least one public key. Optionally, the public key information may further include the integrity protection algorithm information.

It should be noted that, if the core network device sends the private key information to the network device 3 in step 602, to obtain, through parsing, the at least one private key and the at least one public key corresponding to the at least one private key, the network device 3 subsequently sends the public key information to the terminal device (in this case, the network device does not transparently transmit the public key information). In this case, step 603 may not be performed.

Step 604*a*: The core network device sends indication information to the network device 3, where the indication information is used to indicate a valid area to which the public key information is applicable. Further, the network device 3 may send the indication information to the terminal device (in this case, the network device 3 may parse the indication information, that is, does not transparently transmit the indication information).

An alternative manner of step 604*a* is as follows: Step 604*b*: The core network device sends indication information to the terminal device through the network device 3 (in this case, the network device transparently transmits the indication information), where the indication information is used to indicate a valid area to which the public key information is applicable.

It should be noted that: (1) step 603 is an optional step, in other words, step 603 may not be performed, and the network device 3 sends the public key information to the terminal device. Step 604*a* and step 604*b* are optional steps, in other words, step 604*a* and step 604*b* may not be performed.

(2) For specific descriptions of the indication information in step 604*a* and step 604*b*, refer to Embodiment 1.

(3) For step 602 and step 604*a*, the core network device may send the at least one private key, the at least one public key, and the indication information by using a same message or different messages. For step 603 and step 604*b*, the core network device may send the public key information and the indication information by using a same message or different messages.

FIG. 7 is a schematic flowchart corresponding to another communication method according to Embodiment 3 of this application. As shown in FIG. 7, the method includes the following steps.

Step 701: The core network device determines at least one private key, at least one public key corresponding to the at least one private key, and an index of the at least one private key (or referred to as an index of the at least one public key).

Step 702: The core network device sends private key information to the network device 3, where the private key information includes the at least one private key and the index of the at least one private key. Optionally, the core network device may further send integrity protection algorithm information to the network device 3.

Step 703*a*: The core network device sends public key information to a terminal device through the network device 3 (in this case, the network device 3 transparently transmits the public key information), where the public key information includes the at least one public key and the index of the at least one public key. Optionally, the public key information may further include the integrity protection algorithm information.

An alternative manner of step 703*a* is as follows: Step 703*b*: The core network device sends the at least one public key to the network device 3. Further, the network device 3 may send the public key information to a terminal device (in this case, the network device 3 does not transparently transmit the public key information). In an example, the core network device may send the private key information and the at least one public key to the network device 3 by using one message.

Step 704*a*: The core network device sends indication information to the network device 3, where the indication information is used to indicate a valid area to which the public key information is applicable. Further, the network device 3 may send the indication information to the terminal device (in this case, the network device 3 may parse the indication information, that is, does not transparently transmit the indication information).

An alternative manner of step 704*a* is as follows: Step 704*b*: The core network device sends indication information to the terminal device through the network device 3, where the indication information is used to indicate a valid area to which the public key information is applicable.

It should be noted that: (1) step 704*a* and step 704*b* are optional steps, in other words, step 704*a* and step 704*b* may not be performed.

(2) For specific descriptions of the indication information in step 704*a* and step 704*b*, refer to Embodiment 1.

(3) For step 702 and step 704*a*, the core network device may send the at least one private key, the at least one public key, and the indication information by using a same message or different messages. For step 703*a* and step 704*b*, the core network device may send the public key information and the indication information by using a same message or different messages. For step 703*b* and step 704*a*, the core network device may send the public key information and the indication information by using a same message or different messages.

For Embodiment 1 to Embodiment 3, it should be noted that for related content in Embodiment 1 to Embodiment 3, refer to each other. Embodiment 1 to Embodiment 3 may be separately implemented or implemented in any combination thereof. For example, Embodiment 1 and Embodiment 2 are combined for implementation, or Embodiment 1, Embodiment 2, and Embodiment 3 are combined for implementation. This is not specifically limited. For example, for a possible manner of combining Embodiment 1, Embodiment 2, and Embodiment 3 for implementation, refer to descriptions of Embodiment 4.

Embodiment 4

Figure 8:
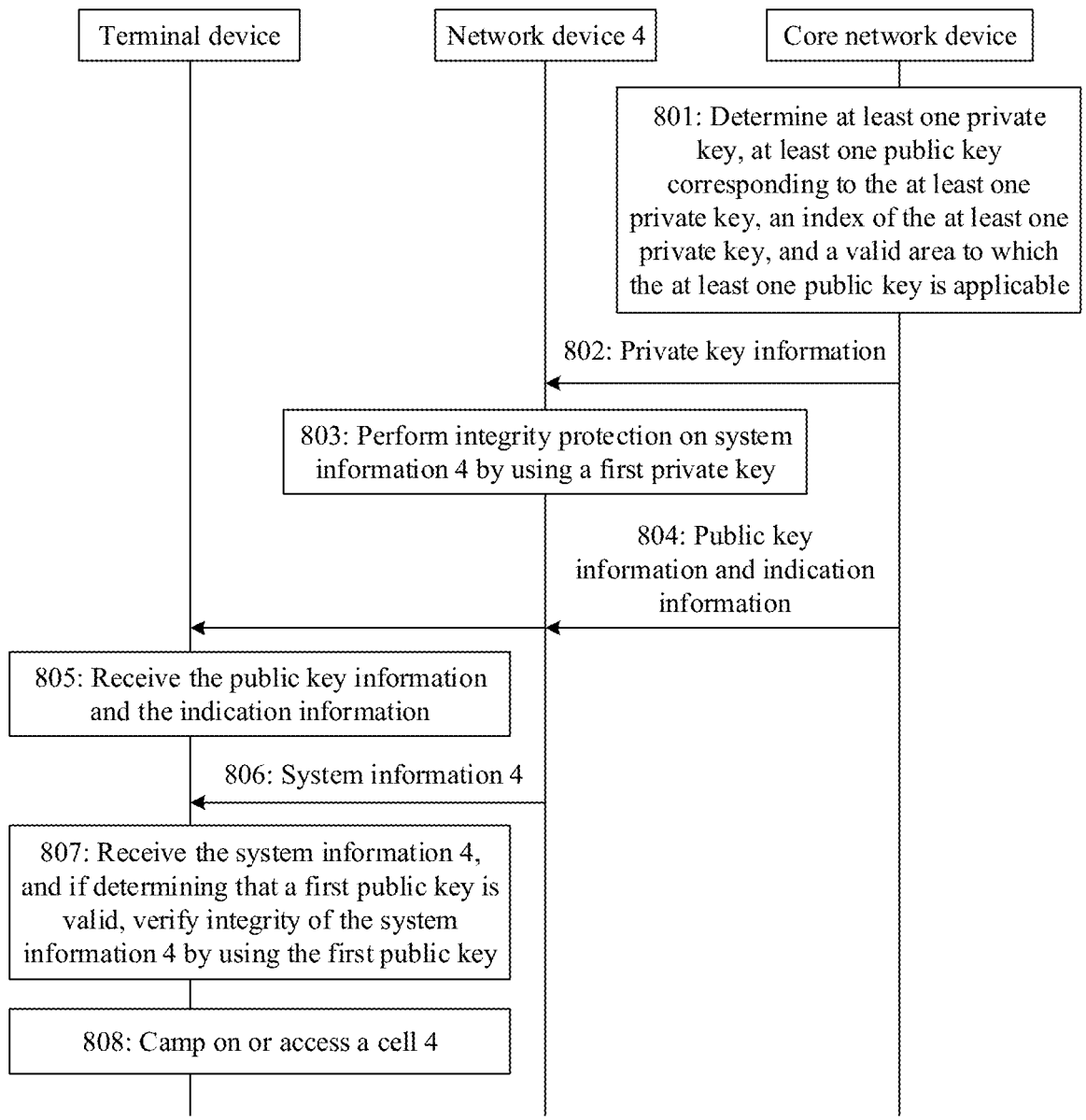
FIG. 8 is a schematic flowchart corresponding to a communication method according to Embodiment 4 of this application.

The following describes a possible procedure of interaction between a terminal device, a network device, and a core network device with reference to FIG. 8. A network device 4 is a genuine network device.

FIG. 8 is a schematic flowchart corresponding to a communication method according to Embodiment 4 of this application. As shown in FIG. 8, the method includes the following steps.

Step 801: The core network device determines at least one private key, at least one public key corresponding to the at least one private key, an index of the at least one private key, and a valid area to which the at least one public key is applicable.

Step 802: The core network device sends private key information to the network device 4, where the private key information includes the at least one private key and the index of the at least one private key. Optionally, the core network device may further send integrity protection algorithm information to the network device 4.

Step 803: The network device 4 receives the private key information, and performs integrity protection on system information 4 by using a first private key.

For example, the network device may determine an integrity protection algorithm based on the integrity protection algorithm information received from the core network device, and then perform integrity protection on the system information 4 by using the first private key and the integrity protection algorithm.

Step 804: The core network device sends public key information and indication information to the terminal device, where the public key information includes the at least one public key and an index of the at least one public key, and the indication information is used to indicate a valid area to which the public key information is applicable (namely, the valid area to which the at least one public key is applicable). Optionally, the public key information may further include the integrity protection algorithm information.

Step 805: The terminal device receives the public key information and the indication information.

Step 806: The network device 4 sends the system information 4 in a cell 4, where the system information 4 includes an index of a first public key.

Optionally, the system information 4 may further include the integrity protection algorithm information corresponding to the first public key, and the integrity protection algorithm information is used by the terminal device to determine an integrity protection algorithm used to verify the system information 4.

Step 807: The terminal device receives the system information 4, determines that the first public key is valid, and verifies integrity of the system information 4 by using the first public key.

For example, the terminal device may obtain the integrity protection algorithm, and then verify the integrity of the system information 4 by using the first public key and the integrity protection algorithm. The terminal device may obtain the integrity protection algorithm in a plurality of manners. For example, the terminal device obtains the integrity protection algorithm from the public key information, or the terminal device obtains the integrity protection algorithm from the system information 4.

Step 808: The terminal device successfully performs verification, indicating that the cell 4 is a genuine cell (or the network device 4 is a genuine network device), and the terminal device may camp on or access the cell 4.

It should be noted that, for a specific implementation of related steps shown in FIG. 8, refer to descriptions in Embodiment 1, Embodiment 2, and Embodiment 3. Details are not described again.

Embodiment 5

In the system architecture shown in FIG. 1, the first terminal device and the second terminal device may further communicate with each other by using an SL resource. For example, the first terminal device serves as scheduling UE, a UE header, or a local manager (scheduling UE, UE header, or local manager), and is responsible for scheduling another terminal device in an area. Alternatively, if the terminal devices in the area are considered as a scheduling group, the scheduling UE may also be referred to as a scheduling group header. The scheduling group header may send system information on an SL resource, and declare that the scheduling group header is a local manager, and is responsible for subsequently allocating an SL resource to a terminal device in the scheduling group. Correspondingly, after receiving the system information, the terminal device in the scheduling group may access the scheduling group header. However, if no security protection is performed on the system information, the terminal device in the scheduling group may fail to identify validity of the received system information.

Based on this, Embodiment 5 of this application provides a communication method, so that a terminal device in a scheduling group can effectively identify validity of received system information. For example, an asymmetric key mechanism may be introduced to perform integrity protection on the system information.

Figure 9:
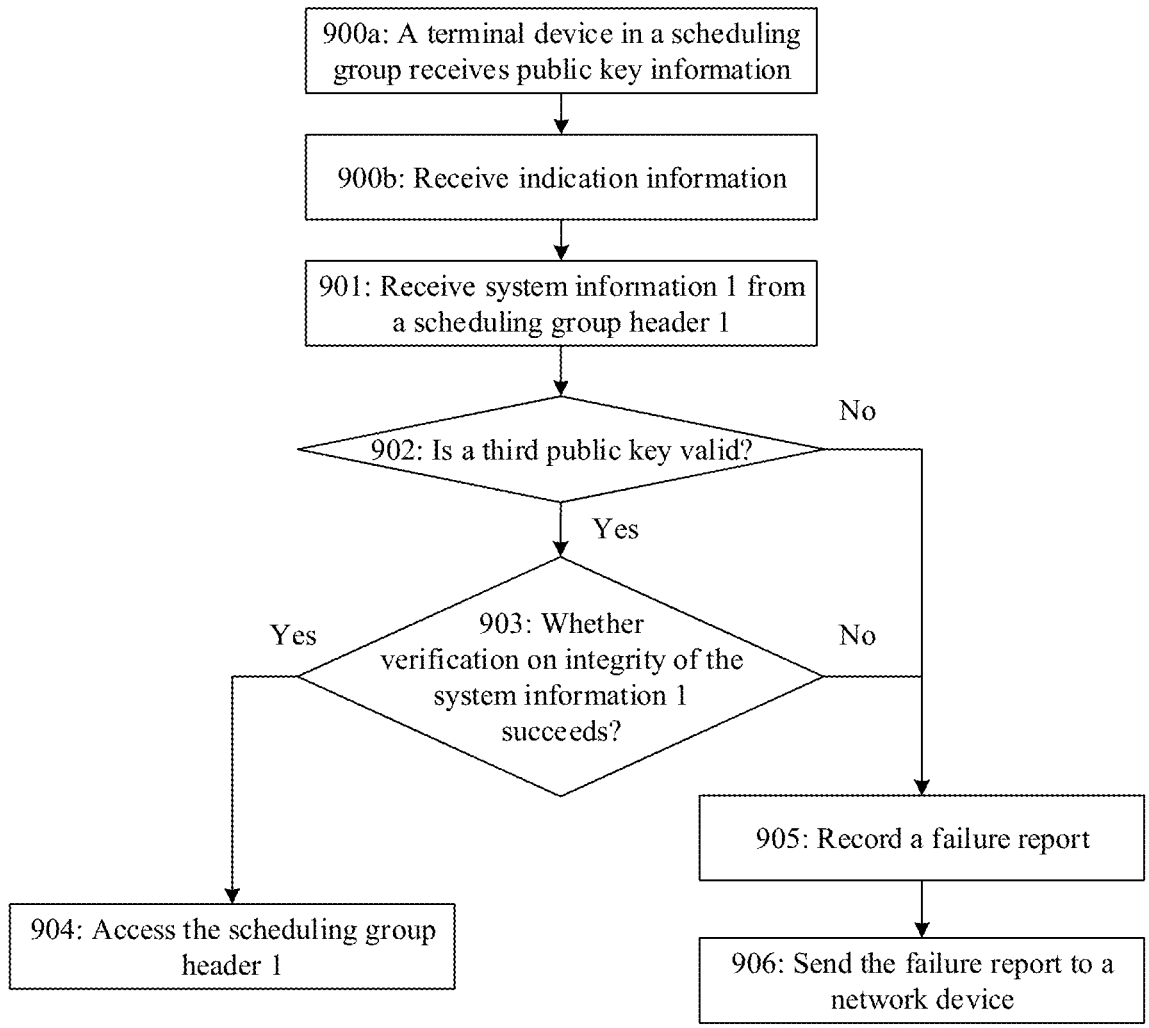
FIG. 9 is a schematic flowchart corresponding to a communication method according to Embodiment 5 of this application.
Figure 10:
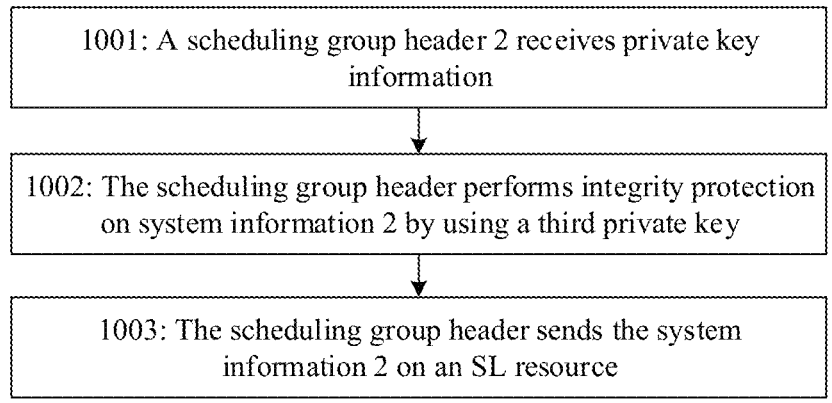
FIG. 10 is a schematic flowchart corresponding to another communication method according to Embodiment 5 of this application.
Figure 11:
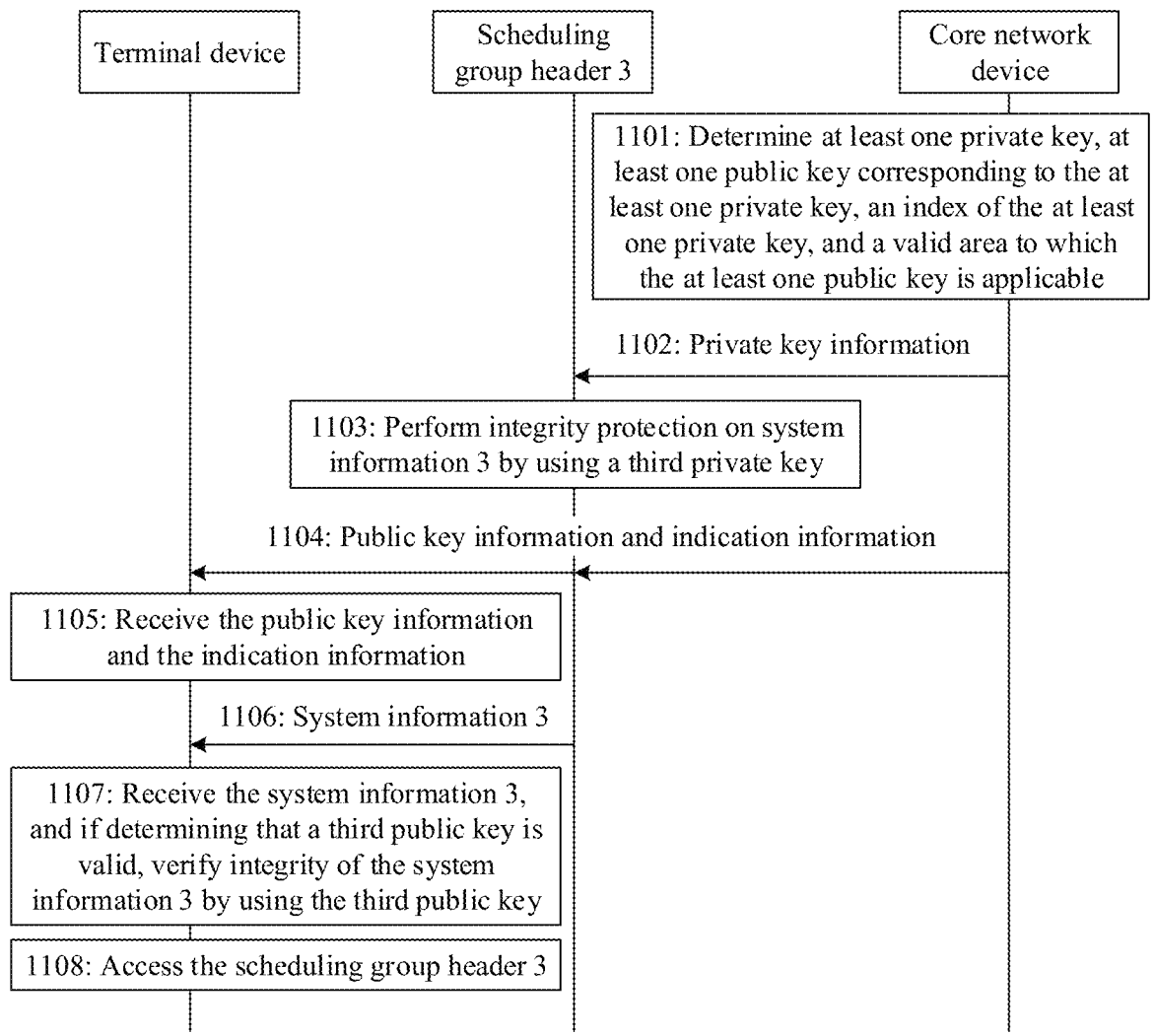
FIG. 11 is a schematic flowchart corresponding to another communication method according to Embodiment 5 of this application.

Devices in the communication method according to Embodiment 5 of this application may include a scheduling group header, a terminal device in a scheduling group, and a core network device. FIG. 9 describes implementation of the terminal device in the scheduling group. FIG. 10 describes implementation of the scheduling group header. FIG. 11 describes an example of a possible procedure of interaction between the scheduling group header, the terminal device in the scheduling group, and the core network device. For implementation of the core network device, refer to related descriptions in FIG. 11. This is not separately listed.

FIG. 9 is a schematic flowchart corresponding to a communication method according to Embodiment 5 of this application. A scheduling group header 1 described in FIG. 9 may be a genuine scheduling group header, or may be a fake scheduling group header. As shown in FIG. 9, the method includes the following steps.

Step 900*a*: The terminal device (which may be any terminal device in the scheduling group except the scheduling group header) receives public key information, where the public key information includes at least one public key and an index of the at least one public key. Herein, there may be a plurality of implementations in which the terminal device receives the public key information. For example, the terminal device may receive the public key information from the core network device or a network device.

Step 900*b*: The terminal device receives indication information, where the indication information is used to indicate a valid area to which the public key information is applicable.

Step 901: The terminal device receives system information 1 from the scheduling group header 1, where the system information 1 includes a third public key and/or an index of the third public key.

Step 902: The terminal device determines whether the third public key is valid, and if the third public key is valid, performs step 903; if the third public key is invalid, performs step 905.

Step 903: The terminal device verifies integrity of the system information 1 by using the third public key, and if the verification succeeds, performs step 904; if the verification fails, performs step 905 to step 907.

Step 904: The terminal device determines that the scheduling group header 1 is a genuine scheduling group header, and the terminal device may access the scheduling group header 1.

Step 905: The terminal device records a failure report, where the failure report may include identification information of the scheduling group header, location information of the terminal device, and an exception cause, and the exception cause may include that integrity verification on the system information fails and/or the scheduling group header is a fake scheduling group header.

Step 906: The terminal device sends the failure report to the network device.

It should be noted that an implementation idea of the terminal device in the scheduling group is consistent with the idea of the terminal device described in Embodiment 1. Differences between the terminal device in the scheduling group and the described terminal device may include: For example, the terminal device in the scheduling group performs the integrity verification on the system information sent by the scheduling group header, and the terminal device in Embodiment 1 performs the integrity verification on the system information sent by the network device. For another example, if the verification succeeds, the terminal device in the scheduling group may access the scheduling group header, and if the verification succeeds, the terminal device in Embodiment 1 may camp on or access a corresponding cell. For another example, the failure report recorded by the terminal device in the scheduling group may include the identification information of the scheduling group header, the location information of the terminal device, and the exception cause, and the exception cause may include that the integrity verification on the system information fails and/or the scheduling group header is a fake scheduling group header. The failure report is different from the failure report recorded by the terminal device in Embodiment 1. For another example, the terminal device in the scheduling group may send the failure report to a network device to which a currently accessed cell (for example, the cell 1) belongs, and the terminal device in Embodiment 1 needs to select the cell 2 from the current cell (for example, the cell 1) or perform reselection from the current cell (for example, the cell 1) to the cell 2 and sends the failure report to the network device to which the cell 2 belongs. For other content except this difference, refer to each other. For example, a specific implementation in which the terminal device receives the public key information in step 900*a* may be the same as a specific implementation in which the terminal device receives the public key information in step 300*a*. For another example, a specific implementation in which the terminal device receives the indication information in step 900*b* may be the same as a specific implementation in which the terminal device receives the indication information in step 300*b*. For another example, a specific implementation in which the terminal device determines whether the third public key is valid in step 902 may be the same as a specific implementation in which the terminal device determines whether the first public key is valid in step 302.

FIG. 10 is a schematic flowchart corresponding to another communication method according to Embodiment 5 of this application. A scheduling group header 2 described in FIG. 10 is a genuine scheduling group header. As shown in FIG. 10, the method includes the following steps.

Step 1001: The scheduling group header 2 receives private key information, where the private key information may include at least one private key and an index of the at least one private key. Herein, there may be a plurality of implementations in which the scheduling group header receives the private key information. For example, the scheduling group header receives the private key information through a core network device or a network device. For example, for details, refer to an implementation in which the terminal device in the scheduling group receives the public key information.

Step 1002: The scheduling group header performs integrity protection on system information 2 by using a third private key.

Step 1003: The scheduling group header sends the system information 2 on an SL resource, where the system information 2 includes a third public key corresponding to the third private key and/or an index of the third public key. The index of the third public key is the same as an index of the third private key corresponding to the third public key.

In an example, the system information 2 may further include information used to declare that the system information 2 is a scheduling group header.

It should be noted that an implementation idea of the scheduling group header is consistent with the idea of the network device described in Embodiment 2. Differences between the scheduling group header and the network device may include: For example, the scheduling group header is not responsible for sending public key information to the terminal device in the scheduling group, and the network device in Embodiment 2 may send the public key information to the terminal device. For another example, the scheduling group header is not responsible for sending indication information to the terminal device in the scheduling group, and the network device in Embodiment 2 may send the indication information to the terminal device. For another example, the network device sends the system information on an air interface resource, and the scheduling group header sends the system information on the SL resource. Other content except this difference may be cross-referenced. For example, a specific implementation in which the scheduling group header performs integrity protection on the system information 2 by using the third private key in step 1002 may be the same as a specific implementation in which the network device 2*a* performs integrity protection on the system information 3 by using the first private key in step 401.

For example, a specific implementation in which the scheduling group header 2 receives the private key information in step 1001 may be the same as a specific implementation in which the terminal device receives the public key information in step 900*a*.

FIG. 11 is a schematic flowchart corresponding to another communication method according to Embodiment 5 of this application. As shown in FIG. 11, the method includes the following steps.

Step 1101: The core network device determines at least one private key, at least one public key corresponding to the at least one private key, an index of the at least one private key, and a valid area to which the at least one public key is applicable.

Step 1102: The core network device sends private key information to a scheduling group header 3, where the private key information includes the at least one private key and the index of the at least one private key.

Step 1103: The scheduling group header 3 receives the private key information, and performs integrity protection on system information 3 by using a third private key.

Step 1104: The core network device sends public key information and indication information to the terminal device in the scheduling group, where the public key information includes the at least one public key and an index of the at least one public key, and the indication information is used to indicate a valid area to which the public key information is applicable.

Step 1105: The terminal device receives the public key information and the indication information.

Step 1106: The scheduling group header 3 sends the system information 3, where the system information 3 includes an index of a third public key Step 1107: The terminal device receives the system information 3, and if determining that the third public key is valid, the terminal device verifies integrity of the system information 3 by using the third public key.

Step 1108: After verification succeeds, the terminal device determines that the scheduling group header 3 is a genuine scheduling group header, and accesses the scheduling group header 3.

It should be noted that: (1) In FIG. 11, the core network device may send the private key information to the scheduling group header, and send the public key information (and the indication information) to the terminal device through the network device (in this case, the network device may transparently transmit the information). In another possible embodiment, alternatively, the core network device may first send, to the network device, the at least one private key, the at least one public key corresponding to the at least one private key, the index of the at least one private key, and an identifier of the valid area to which the at least one public key is applicable. Then, the network device sends the private key information to the scheduling group header and sends the public key information (and the indication information) to the terminal device (in this case, the network device does not transparently transmit the information). This is not specifically limited. (2) For a specific implementation of related steps shown in FIG. 11, refer to the descriptions in FIG. 9 and FIG. 10. Details are not described again.

In this embodiment of this application, Embodiment 1 to Embodiment 4 mainly describe how the terminal device identifies validity of the system information sent by the network device, and Embodiment 5 mainly describes how the terminal device in the scheduling group identifies validity of the system information sent by the scheduling group header. Embodiment 1 to Embodiment 4 and Embodiment 5 may be separately implemented or may be implemented in combination.

In an example, when Embodiment 1 to Embodiment 4 and Embodiment 5 are implemented in combination, the public key and the private key in the former may be different from the public key and the private key in the latter. For example, the core network device may determine first key information (at least one private key, at least one public key corresponding to the at least one private key, and an index of the at least one private key) and second key information (at least one private key, at least one public key corresponding to the at least one private key, and an index of the at least one private key). The public key and the private key included in the first key information are different from the public key and the private key included in the second key information. The first key information is used to verify the system information between the terminal device and the network device, and the second key information is used to verify the system information between the terminal device in the scheduling group and the scheduling group header.

In an example, when Embodiment 1 to Embodiment 4 and Embodiment 5 are implemented in combination, it may be understood that the scheduling group header has two roles, and performs functions of the two roles, where one role is the terminal device in Embodiment 1, and the other role is the scheduling group header in Embodiment 5. The terminal device in the scheduling group may be understood as having two roles and performing functions of the two roles, where one role is the terminal device in Embodiment 1, and the other role is the terminal device in the scheduling group in Embodiment 5.

The foregoing mainly describes the solutions provided in the embodiments of this application from a perspective of interaction between the network device, the terminal device, and the core network device. It may be understood that, to implement the foregoing functions, the network device or the terminal device may include corresponding hardware structures and/or software modules for performing the functions. A person skilled in the art should be easily aware that, in combination with units and algorithm steps of the examples described in the embodiments disclosed in this specification, the embodiments of this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 12:
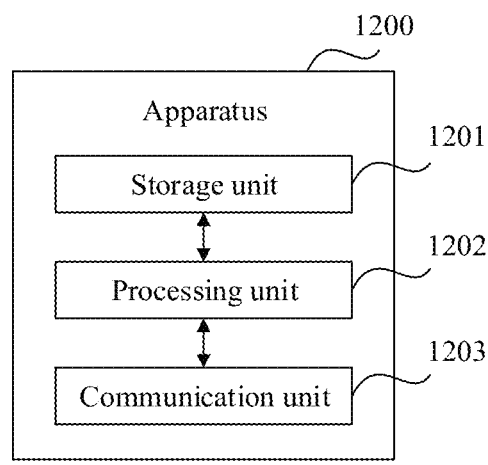
FIG. 12 is a schematic structural diagram of an apparatus according to an embodiment of this application.

When an integrated unit (module) is used, FIG. 12 is a possible example block diagram of an apparatus according to an embodiment of this application. The apparatus 1200 may exist in a form of software. The apparatus 1200 may include a processing unit 1202 and a communication unit 1203. The processing unit 1202 is configured to control and manage an action of the apparatus 1200. The communication unit 1203 is configured to support the apparatus 1200 in communicating with another network entity. Optionally, the communication unit 1203 is also referred to as a transceiver unit, and may include a receiving unit and/or a sending unit, which are respectively configured to perform a receiving operation and a sending operation. The apparatus 1200 may further include a storage unit 1201, configured to store program code and/or data of the apparatus 1200.

The processing unit 1202 may be a processor or a controller, and may implement or execute various examples of logical blocks, modules, and circuits described with reference to content disclosed in the embodiments of this application. The communication unit 1203 may be a communication interface, a transceiver, a transceiver circuit, or the like, where the communication interface is a general name, and may include a plurality of interfaces in a specific implementation. The storage unit 1201 may be a memory.

The apparatus 1200 may be the terminal device in any one of the foregoing embodiments, or may be a semiconductor chip disposed in the terminal device. The processing unit 1202 may support the apparatus 1200 in performing actions of the terminal device in the foregoing method examples. Alternatively, the processing unit 1202 mainly performs internal actions of the terminal in the method examples, and the communication unit 1203 may support communication between the apparatus 1200 and a network device. For example, the processing unit 1202 is configured to perform step 302, step 303, step 304, step 305, and step 306 in FIG. 3, and step 808 in FIG. 8. The communication unit 1203 is configured to perform step 300a, step 300b, step 301, and step 307 in FIG. 3, and step 805 and step 807 in FIG. 8.

Specifically, in an embodiment, the communication unit is configured to receive first system information from a first network device, where the first system information includes a first public key and/or an index of the first public key. The processing unit is configured to: if determining that the first public key is valid, verify integrity of the first system information by using the first public key.

In a possible design, integrity protection is performed on the first system information based on a first private key corresponding to the first public key.

In a possible design, the communication unit is further configured to receive public key information, where the public key information includes at least one public key. The processing unit is specifically configured to: if the at least one public key includes the first public key, determine that the first public key is valid.

In a possible design, the communication unit is further configured to receive public key information, where the public key information includes at least one public key and an index of the at least one public key. The processing unit is specifically configured to: if the at least one public key includes the first public key, and/or the index of the at least one public key includes the index of the first public key, determine that the first public key is valid.

In a possible design, the communication unit is further configured to receive indication information, where the indication information is used to indicate a valid area to which the public key information is applicable.

In a possible design, the indication information includes an identifier of the valid area to which the public key information is applicable.

The identifier of the valid area includes at least one of the following: a public land mobile network identifier; a radio access network notification area identifier; a tracking area identity; a cell identifier; and a private network identifier.

In a possible design, the indication information is used to indicate that the valid area to which the public key information is applicable is a tracking area list of the terminal device, or the indication information is used to indicate that the valid area to which the public key information is applicable is a radio access network notification area of the terminal device.

In a possible design, the processing unit is further configured to: if verification on the first system information fails, record a failure report, where the failure report includes information about a first cell, location information, and an exception cause. The exception cause includes at least one of the following: integrity verification on the system information fails, the first cell is a fake cell, and the first network device is a fake network device.

In a possible design, the processing unit is further configured to perform reselection from the first cell to a second cell; and send the failure report to a second network device to which the second cell belongs.

In a possible design, before the communication unit sends the failure report to the second network device, the processing unit is further configured to determine that verification on second system information sent by the second network device succeeds.

The apparatus 1200 may be the network device in any one of the foregoing embodiments, or may be a semiconductor chip disposed in the network device. The processing unit 1202 may support the apparatus 1200 in performing actions of the network device in the foregoing method examples. Alternatively, the processing unit 1202 mainly performs internal actions of the network device in the method examples, and the communication unit 1203 may support communication between the apparatus 1200 and a terminal device. For example, the processing unit 1202 is configured to perform step 401 in FIG. 4 and step 501 in FIG. 5. The communication unit 1203 is configured to perform step 400a to step 400d, step 402, and step 403 in FIG. 4, and step 500a to step 500e, step 502, and step 503 in FIG. 5.

Specifically, in an embodiment, the processing unit is configured to perform integrity protection on first system information by using a first private key. The communication unit is configured to send the first system information, where the first system information includes a first public key corresponding to the first private key and/or an index of the first public key.

In a possible design, the communication unit is further configured to receive private key information from a core network device, where the private key information includes at least one private key and at least one public key corresponding to the at least one private key, and the first private key is one of the at least one private key.

In a possible design, the communication unit is further configured to send public key information to a terminal device, where the public key information includes the at least one first key.

In a possible design, the communication unit is further configured to receive private key information from a core network device, where the private key information includes at least one private key and an index of the at least one private key, the first private key is one of the at least one private key, and an index of the first private key is the same as the index of the first public key.

In a possible design, the communication unit is further configured to: receive at least one public key from the core network device, where the at least one public key is in a one-to-one correspondence with the at least one private key; and send public key information to a terminal device, where the public key information includes the at least one public key and an index of the at least one public key.

In a possible design, the communication unit is further configured to receive indication information from the core network device, where the indication information is used to indicate a valid area to which the public key information is applicable.

In a possible design, the communication unit is further configured to send the indication information to the terminal device, where the indication information is used to indicate the valid area to which the public key information is applicable.

In a possible design, the indication information includes an identifier of the valid area to which the public key information is applicable, where the identifier of the valid area includes at least one of the following: a public land mobile network identifier; a radio access network notification area identifier; a tracking area identity; a cell identifier; and a private network identifier.

In a possible design, the indication information is used to indicate that the valid area to which the public key information is applicable is a tracking area list of the terminal device, or the indication information is used to indicate that the valid area to which the public key information is applicable is a radio access network notification area of the terminal device.

In a possible design, the communication unit is further configured to receive a failure report sent by the terminal device, where the failure report includes information about a third cell, location information of the terminal device, and an exception cause. The exception cause includes at least one of the following: integrity verification on the system information fails, the third cell is a fake cell, and a third network device to which the third cell belongs is a fake network device.

Figure 13:
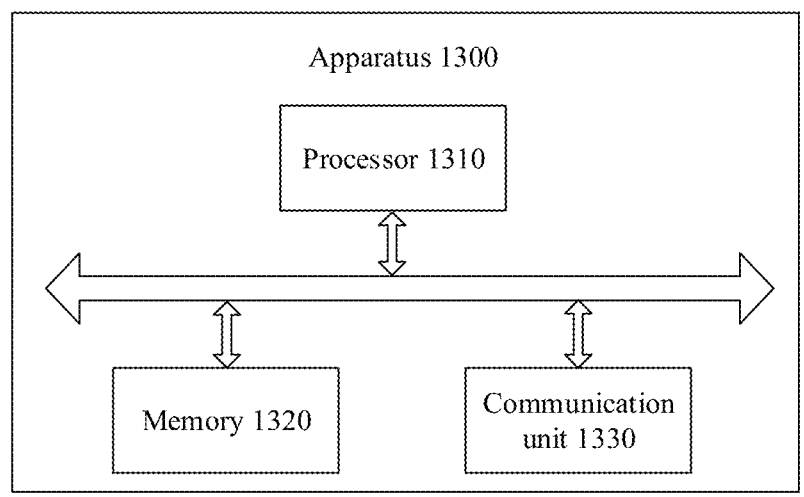
FIG. 13 is a schematic structural diagram of another apparatus according to still another embodiment of this application.

FIG. 13 is a schematic structural diagram of an apparatus. The apparatus 1300 includes a processor 1310, a memory 1320, and a communication unit 1330. In an example, the apparatus 1300 may implement a function of the apparatus 1200 shown in FIG. 12. Specifically, functions of the communication unit 1203 shown in FIG. 12 and the communication unit 1330 shown in FIG. 13 may be implemented by a transceiver and/or a communication interface. The transceiver may be used for air interface communication between a network device and a terminal device, and the communication interface may be used for communication between a network device and a core network device, or between network devices. A function of the processing unit 1202 may be implemented by the processor, and a function of the storage unit 1201 may be implemented by the memory. In another example, the apparatus 1300 may be the network device in the method embodiment, or may be the terminal device in the foregoing method embodiment, or may be the core network device in the foregoing method embodiment. The apparatus 1300 may be configured to implement the method corresponding to the network device, the terminal device, or the core network device described in the foregoing method embodiments. For details, refer to the descriptions in the foregoing method embodiments.

Figure 14:
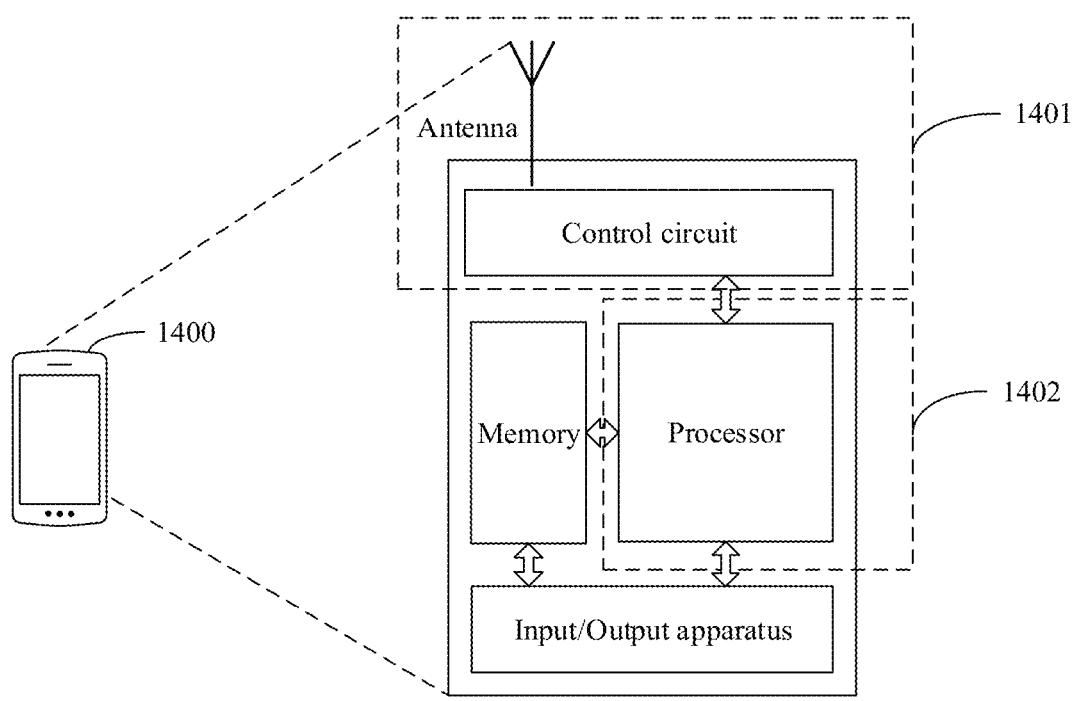
FIG. 14 is a schematic structural diagram of a terminal device according to an embodiment of this application.

FIG. 14 is a schematic structural diagram of a terminal device 1400 according to an embodiment of this application. For ease of description, FIG. 14 shows only main components of the terminal device. As shown in FIG. 14, the terminal device 1400 includes a processor, a memory, a control circuit, an antenna, and an input/output apparatus. The terminal device 1400 may be used in the system architecture shown in FIG. 1, and perform the function of the terminal device in the foregoing method embodiment.

The processor is mainly configured to process a communication protocol and communication data, control the entire terminal device, execute a software program, and process data of the software program, for example, configured to control the terminal device in performing the actions described in the foregoing method embodiment. The memory is mainly configured to store the software program and the data. The control circuit is mainly configured to: perform conversion between a baseband signal and a radio frequency signal, and process the radio frequency signal. A combination of the control circuit and the antenna may also be referred to as a transceiver, mainly configured to send and receive a radio frequency signal in a form of an electromagnetic wave. The input/output apparatus, such as a touchscreen, a display screen, or a keyboard, is mainly configured to: receive data entered by a user, and output data to the user.

After the terminal device is powered on, the processor may read the software program in a storage unit, interpret and execute instructions of the software program, and process the data of the software program. When data needs to be sent wirelessly, the processor performs baseband processing on the to-be-sent data, and then outputs a baseband signal to a radio frequency circuit. The radio frequency circuit performs radio frequency processing on the baseband signal, and then sends, by using the antenna, a radio frequency signal in an electromagnetic wave form. When data is sent to the terminal device, the radio frequency circuit receives the radio frequency signal through the antenna, converts the radio frequency signal into a baseband signal, and outputs the baseband signal to the processor. The processor converts the baseband signal into data and processes the data.

A person skilled in the art may understand that for ease of description, FIG. 14 shows only one memory and one processor. An actual terminal device may have a plurality of processors and a plurality of memories. The memory may also be referred to as a storage medium, a storage device, or the like. This is not limited in the embodiments of this application.

In an optional implementation, the processor may include a baseband processor and a central processing unit. The baseband processor is mainly configured to process a communication protocol and communication data. The central processing unit is mainly configured to: control the entire terminal device, execute a software program, and process data of the software program. The processor in FIG. 14 integrates functions of the baseband processor and the central processing unit. A person skilled in the art may understand that the baseband processor and the central processing unit may be processors independent of each other, and are interconnected by using technologies such as a bus. A person skilled in the art may understand that the terminal device may include a plurality of baseband processors to adapt to different network standards, the terminal device may include a plurality of central processing units to improve a processing capability of the terminal device, and parts of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of a software program. The processor executes the software program to implement a baseband processing function.

For example, if the apparatus 1200 shown in FIG. 12 is a terminal device, in the embodiment of FIG. 14, the antenna and the control circuit that have transceiver functions may be considered as the communication unit of the apparatus 1200, and the processor that has a processing function may be considered as the processing unit of the apparatus 1200. For example, the communication unit may include a receiving unit and a sending unit. The receiving unit may also be referred to as a receiver machine, a receiver, a receiver circuit, or the like. The sending unit may be referred to as a transmitter machine, a transmitter, a transmitter circuit, or the like.

The terminal device 1400 shown in FIG. 14 can implement all processes related to the terminal device in the method embodiment in FIG. 3 or FIG. 8. The operations and/or the functions of the modules in the terminal device 1400 are respectively used to implement corresponding procedures in the foregoing method embodiments. For details, refer to the descriptions in the foregoing method embodiments. To avoid repetition, detailed descriptions are properly omitted herein.

Figure 15:
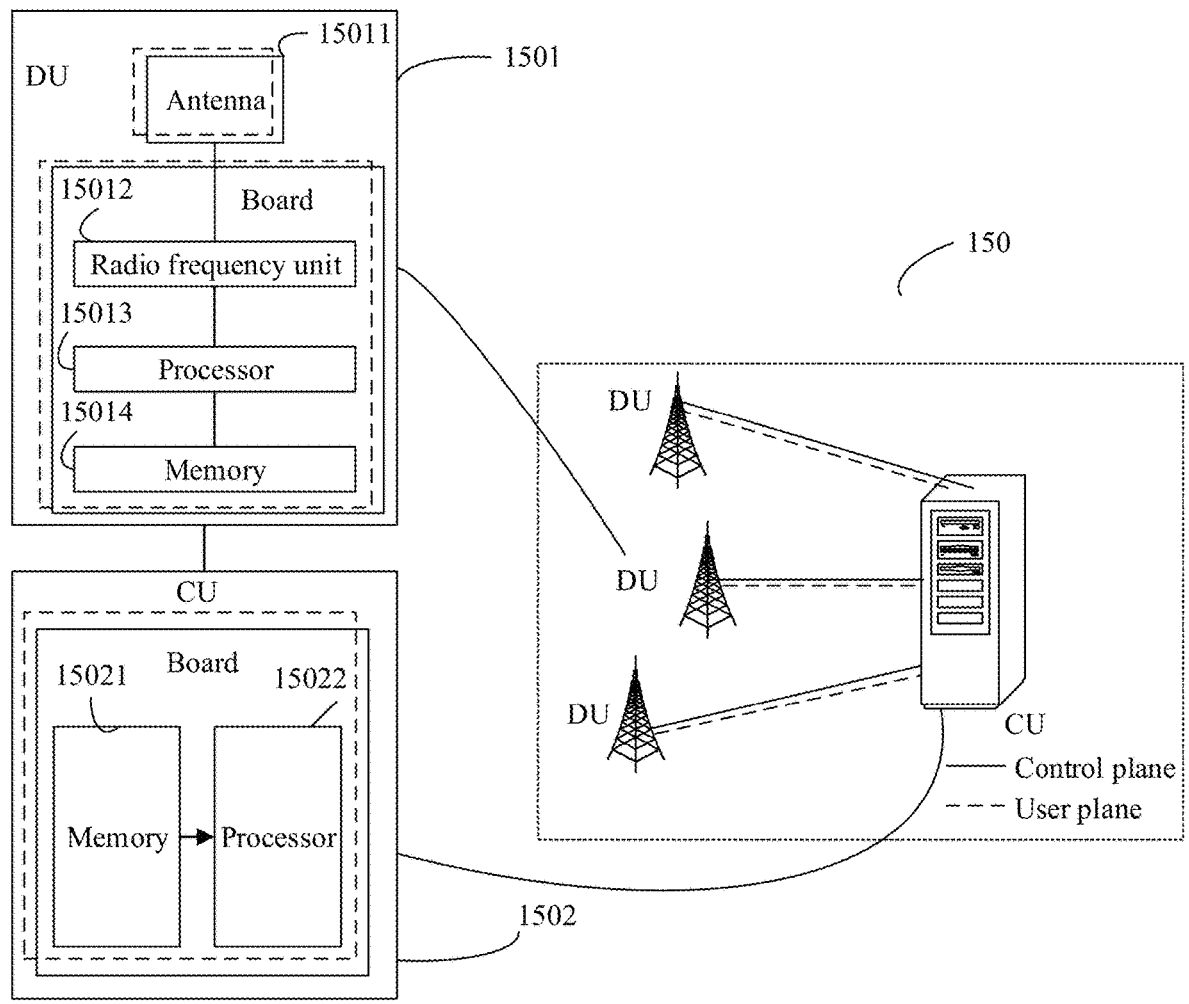
FIG. 15 is a schematic structural diagram of a network device according to an embodiment of this application.

FIG. 15 is a schematic structural diagram of a network device according to an embodiment of this application, for example, may be a schematic structural diagram of a base station. As shown in FIG. 15, the base station may be used in the system shown in FIG. 1, to perform a function of the network device in the foregoing method embodiments. The base station 150 may include one or more DUs 1501 and one or more CUs 1502. The DU 1501 may include at least one antenna 15011, at least one radio frequency unit 15012, at least one processor 15013, and at least one memory 15014. The DU 1501 is mainly configured to receive and send a radio frequency signal, convert a radio frequency signal and a baseband signal, and perform some baseband processing. The CU 1502 may include at least one processor 15022 and at least one memory 15021. The CU 1502 and the DU 1501 may communicate with each other through an interface. A control plane (Control plane) interface may be a Fs-C, for example, an F1-C, and a user plane (User Plane) interface may be a Fs-U, for example, an F1-U.

The CU 1502 is mainly configured to perform baseband processing, control the base station, and the like. The DU 1501 and the CU 1502 may be physically disposed together, or may be physically separated, that is, in a distributed base station. The CU 1502 is a control center of the base station, may also be referred to as a processing unit, and is mainly configured to complete a baseband processing function. For example, the CU 1502 may be configured to control the base station to perform an operation procedure related to the network device in the foregoing method embodiments.

Specifically, baseband processing on the CU and the DU may be divided based on protocol layers of a wireless network. For example, functions of a packet data convergence protocol (packet data convergence protocol, PDCP) layer and a protocol layer above the PDCP layer are set in the CU. Functions of protocol layers below the PDCP, such as a radio link control (radio link control, RLC) layer and a media access control (media access control, MAC) layer, are set in the DU. For another example, the CU implements functions of a radio resource control (radio resource control, RRC) layer and a packet data convergence protocol (packet data convergence protocol, PDCP) layer. The DU implements functions of a radio link control (radio link control, RLC) layer, a media access control (media access control, MAC) layer, and a physical (physical, PHY) layer.

In addition, optionally, the base station 150 may include one or more radio frequency units (RU), one or more DUs, and one or more CUs. The DU may include at least one processor 15013 and at least one memory 15014, the RU may include at least one antenna 15011 and at least one radio frequency unit 15012, and the CU may include at least one processor 15022 and at least one memory 15021.

In an example, the CU 1502 may include one or more boards, and a plurality of boards may jointly support a radio access network (for example, a 5G network) of a single access standard, or may separately support radio access networks (such as an LTE network, a 5G network, or another network) of different access standards. The memory 15021 and the processor 15022 may serve one or more boards. In other words, a memory and a processor may be separately disposed on each board. Alternatively, a plurality of boards may share a same memory and a same processor. In addition, a necessary circuit may be further disposed on each board. The DU 1501 may include one or more boards, and a plurality of boards may jointly support a radio access network (for example, a 5G network) of a single access standard, or may separately support radio access networks (such as an LTE network, a 5G network, or another network) of different access standards. The memory 15014 and the processor 15013 may serve one or more boards. In other words, a memory and a processor may be separately disposed on each board. Alternatively, a plurality of boards may share a same memory and a same processor. In addition, a necessary circuit may be further disposed on each board.

Figure 16:
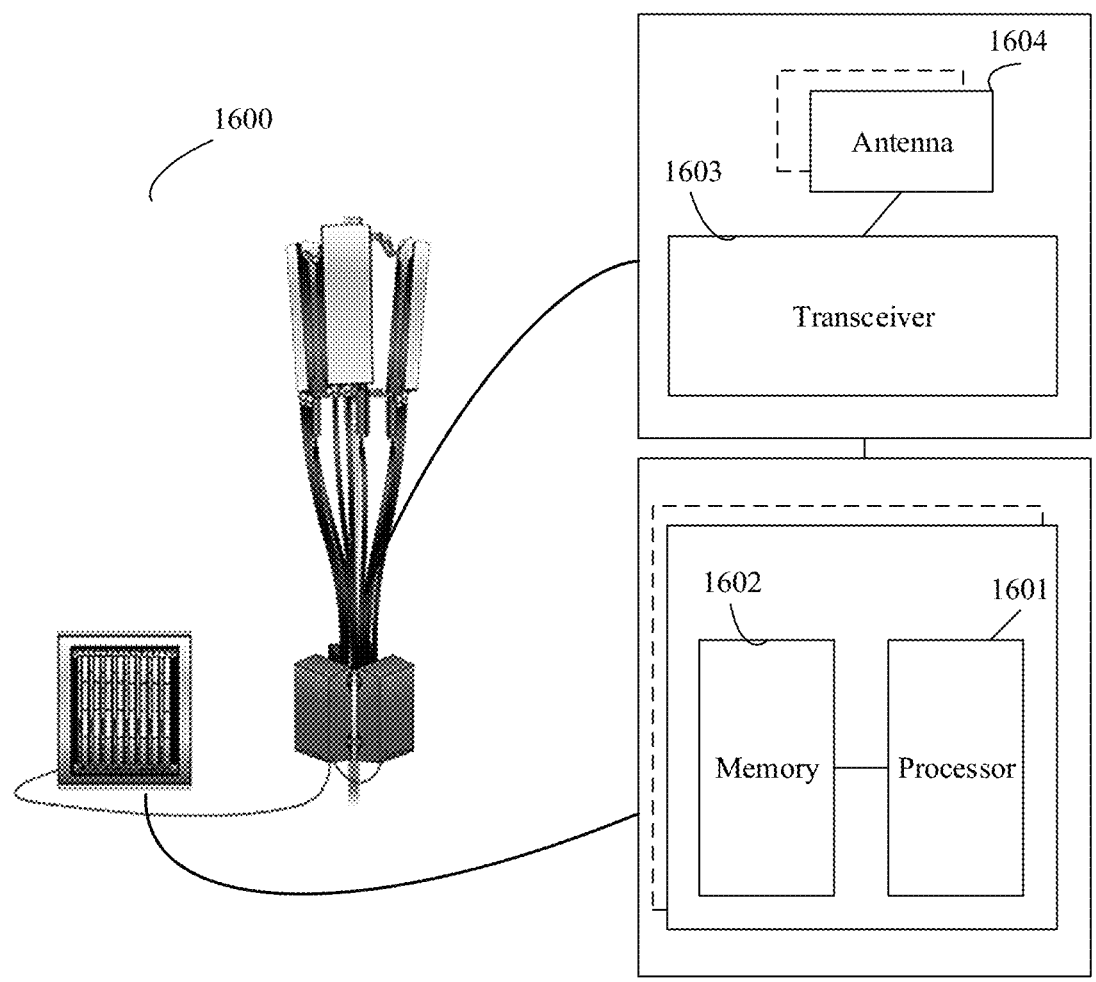
FIG. 16 is a schematic structural diagram of another apparatus according to still another embodiment of this application.

FIG. 16 shows an implementation of a hardware circuit of a communication apparatus. The communication apparatus may be used in the flowchart shown in FIG. 2 to FIG. 10, and performs a function of the network side device in the foregoing method embodiments. For ease of description, FIG. 16 shows only main components of the communication apparatus. Optionally, the communication apparatus may be a network side device, or may be an apparatus, for example, a chip or a chip system, in the network side device. The chip system includes at least one chip, and the chip system may further include another circuit structure and/or discrete component. Optionally, that the communication apparatus is a network side device is used as an example. As shown in FIG. 16, the communication apparatus 800 includes a processor 1601, a memory 1602, a transceiver 1603, an antenna 1604, and the like.

For specific functions of the communication apparatus 1600 shown in FIG. 16, refer to descriptions in the procedures shown in FIG. 2 to FIG. 10. Details are not described herein again.

In an implementation process, the steps of the methods in the embodiments may be performed by using a hardware integrated logic circuit in the processor, or by using instructions in a form of software. The steps of the method disclosed with reference to the embodiments of this application may be directly presented as being performed and completed by a hardware processor, or performed and completed by a combination of hardware and a software module in the processor.

It should be noted that the processor in the embodiments of this application may be an integrated circuit chip, and has a signal processing capability. In an implementation process, steps in the foregoing method embodiments can be implemented by using a hardware integrated logical circuit in the processor, or by using instructions in a form of software. The processor may be a general-purpose central processing unit (central processing unit, CPU), a general-purpose processor, digital signal processing (digital signal processing, DSP), an application-specific integrated circuit (application specific integrated circuits, ASIC), a field programmable gate array (field programmable gate array, FPGA), another programmable logic device, a transistor logic device, a hardware component, or any combination thereof; or may be a combination of processors implementing a computing function, for example, a combination of one or more microprocessors or a combination of a DSP and a microprocessor. The general-purpose processor may be a microprocessor, or the processor may be any conventional processor or the like.

It may be understood that the memory or storage unit in the embodiments of this application may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM). It should be noted that the memory of the systems and methods described in this specification includes but is not limited to these and any memory of another proper type.

All or some of the foregoing embodiments may be implemented by using software, hardware, firmware, or any combination thereof. When software is used to implement the embodiments, all or some of the embodiments may be implemented in a form of a computer program product. The computer program product includes one or more computer programs or instructions. When the computer programs or the instructions are loaded and executed on a computer, all or some of procedures or functions in the embodiments of this application are performed. The computer may be a general-purpose computer, a dedicated computer, a computer network, or another programmable apparatus. The computer programs or instructions may be stored in a computer-readable storage medium, or may be transmitted via the computer-readable storage medium. The computer-readable storage medium may be any usable medium accessible by a computer, or a data storage device, such as a server integrating one or more usable media. The usable medium may be a magnetic medium, for example, a floppy disk, a hard disk, or a magnetic tape; or may be an optical medium, for example, a DVD; or may be a semiconductor medium, for example, a solid-state drive (solid-state drive, SSD).

The various illustrative logical units and circuits described in the embodiments of this application may implement or operate the described functions through a general-purpose processor, a digital signal processor, an application-specific integrated circuit (ASIC), a field programmable gate array (FPGA), another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by using a combination of computing apparatuses, for example, a digital signal processor and a microprocessor, a plurality of microprocessors, one or more microprocessors in combination with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to a processor, so that the processor may read information from the storage medium and write information to the storage medium. Optionally, the storage medium may alternatively be integrated into the processor. The processor and the storage medium may be arranged in the ASIC, and the ASIC may be arranged in a terminal device. Optionally, the processor and the storage medium may alternatively be arranged in different components of the terminal device.

These computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specified function in one or more processes in the flowcharts and/or in one or more blocks in the block diagrams.

Although the embodiments of this application are described with reference to specific features, it is clear that various modifications and combinations may be made to them without departing from the spirit and scope of the embodiments of this application. Correspondingly, the specification and accompanying drawings are merely example descriptions of the embodiments of this application that are defined by the appended claims, and are considered to cover any or all of modifications, variations, combinations, or equivalents in the scope of the embodiments of this application.

What is claimed is:

1. A communication apparatus, wherein the communication apparatus comprises:
   a processor, the processor is coupled to a memory, and the memory is configured to store instructions, and when the instructions are run by the processor, the communication apparatus is enabled to perform:
   receiving first system information from a first network device, wherein the first system information comprises at least one of:
   a first public key; and
   an index of the first public key;
   responsive to determining that the first public key is valid, verifying integrity of the first system information by using the first public key, and
   responsive to the integrity verification on the first system information fails, recording a failure report, wherein the failure report comprises information about (1) a first cell, (2) location information, and (3) an exception cause.

2. The communication apparatus according to claim 1, wherein integrity protection is performed on the first system information based on a first private key corresponding to the first public key.

3. The communication apparatus according to claim 1, wherein the determining that the first public key is valid comprises:
   receiving public key information, wherein the public key information comprises at least one public key; and
   responsive to the at least one public key comprising the first public key, determining that the first public key is valid.

4. The communication apparatus according to claim 3, wherein when the instructions are run by the processor, the communication apparatus is further enabled to perform:

receiving indication information, wherein the indication information is used to indicate a valid area to which the public key information is applicable.

5. The communication apparatus according to claim 4, wherein the indication information comprises an identifier of the valid area to which the public key information is applicable; and
the identifier of the valid area comprises at least one of the following:
a public land mobile network identifier;
a radio access network notification area identifier;
a tracking area identity;
a cell identifier; and
a private network identifier.

6. The communication apparatus according to claim 4, wherein
the indication information is used to indicate that the valid area to which the public key information is applicable is a tracking area list of a terminal device; or
the indication information is used to indicate that the valid area to which the public key information is applicable is a radio access network notification area of the terminal device.

7. The communication apparatus according to claim 1, wherein the determining that the first public key is valid comprises:
receiving public key information, wherein the public key information comprises at least one public key and an index of the at least one public key; and
responsive to the at least one public key comprising the first public key, and the index of the at least one public key comprising the index of the first public key, determining that the first public key is valid.

8. The communication apparatus according to claim 1, wherein
the exception cause comprises at least one of the following:
integrity verification on the first system information fails,
the first cell is a fake cell, and
the first network device is a fake network device.

9. The communication apparatus according to claim 8, wherein when the instructions are run by the processor, the communication apparatus is further enabled to perform:
performing reselection from the first cell to a second cell; and
sending the failure report to a second network device to which the second cell belongs.

10. The communication apparatus according to claim 9, wherein when the instructions are run by the processor, the communication apparatus is further enabled to perform:
before the sending the failure report to the second network device,
determining that verification on second system information sent by the second network device succeeds.

11. A communication apparatus, wherein the communication apparatus comprises:
a processor, the processor is coupled to a memory, and the memory is configured to store instructions, and when the instructions are run by the processor, the communication apparatus is enabled to perform:
performing integrity protection on first system information by using a first private key;
sending the first system information, wherein the first system information comprises a first public key corresponding to at least one of: the first private key and an index of the first public key; and
receiving a failure report sent by the terminal device, wherein the failure report comprises (1) information about a third cell, (2) location information of the terminal device, and (3) an exception cause.

12. The communication apparatus according to claim 11, wherein when the instructions are run by the processor, the communication apparatus is further enabled to perform:
receiving private key information from a core network device, wherein the private key information comprises at least one private key and at least one public key corresponding to the at least one private key, and the first private key is one of the at least one private key.

13. The communication apparatus according to claim 12, wherein when the instructions are run by the processor, the communication apparatus is further enabled to perform:
sending public key information to a terminal device, wherein the public key information comprises the at least one public key.

14. The communication apparatus according to claim 13, wherein
the exception cause comprises at least one of the following: integrity verification on the first system information fails, the third cell is a fake cell, and a third network device to which the third cell belongs is a fake network device.

15. The communication apparatus according to claim 11, wherein when the instructions are run by the processor, the communication apparatus is further enabled to perform:
receiving private key information from a core network device, wherein the private key information comprises at least one private key and an index of the at least one private key, the first private key is one of the at least one private key, and an index of the first private key is the same as the index of the first public key.

16. The communication apparatus according to claim 15, wherein when the instructions are run by the processor, the communication apparatus is further enabled to perform:
receiving at least one public key from the core network device, wherein the at least one public key is in a one-to-one correspondence with the at least one private key; and
sending public key information to a terminal device, wherein the public key information comprises the at least one public key and an index of the at least one public key.

17. The communication apparatus according to claim 16, wherein when the instructions are run by the processor, the communication apparatus is further enabled to perform:
receiving indication information from the core network device, wherein the indication information is used to indicate a valid area to which the public key information is applicable.

18. The communication apparatus according to claim 17, wherein when the instructions are run by the processor, the communication apparatus is further enabled to perform:
sending the indication information to the terminal device, wherein the indication information is used to indicate the valid area to which the public key information is applicable.

19. The communication apparatus according to claim 17, wherein the indication information comprises an identifier of the valid area to which the public key information is applicable; and
the identifier of the valid area comprises at least one of the following:
a public land mobile network identifier;
a radio access network notification area identifier;

a tracking area identity;
a cell identifier; and
a private network identifier.

20. The communication apparatus according to claim 17, wherein
the indication information is used to indicate that the valid area to which the public key information is applicable is a tracking area list of the terminal device; or
the indication information is used to indicate that the valid area to which the public key information is applicable is a radio access network notification area of the terminal device.

* * * * *